United States Patent [19]
Suga et al.

[11] Patent Number: 6,059,285
[45] Date of Patent: May 9, 2000

[54] SHEET CONVEYING APPARATUS

[75] Inventors: Takeshi Suga, Mishima; Masao Watanabe, Numazu; Akihito Mori; Hirokazu Kodama, both of Shizuoka-ken, all of Japan

[73] Assignee: Canon Kabushiki Kaisha, Tokyo, Japan

[21] Appl. No.: 08/991,856

[22] Filed: Dec. 16, 1997

[30] Foreign Application Priority Data

Dec. 18, 1996 [JP] Japan ................................. 8-338755
Jul. 3, 1997 [JP] Japan ................................. 9-178702

[51] Int. Cl.$^7$ .................................................... B65H 7/02
[52] U.S. Cl. .................................... 271/228; 271/252
[58] Field of Search .................................. 271/228, 227, 271/252, 253, 254, 262, 263, 265.04

[56] References Cited

U.S. PATENT DOCUMENTS

| | | | |
|---|---|---|---|
| 4,621,801 | 11/1986 | Sanchez | 271/251 |
| 4,939,676 | 7/1990 | Worsley et al. | 364/562 |
| 4,995,601 | 2/1991 | Ohashi et al. | 271/127 |
| 5,090,680 | 2/1992 | Yashiro | 271/186 |
| 5,090,683 | 2/1992 | Kamath et al. | 271/227 |
| 5,140,166 | 8/1992 | Gerlier | 250/548 |
| 5,156,391 | 10/1992 | Roller | 271/227 |
| 5,640,231 | 6/1997 | Mitsui et al. | |
| 5,678,127 | 10/1997 | Suga | |
| 5,681,036 | 10/1997 | Wakahara et al. | 271/228 X |
| 5,697,609 | 12/1997 | Williams et al. | 271/228 |
| 5,918,876 | 7/1999 | Maruyama et al. | 271/228 |

FOREIGN PATENT DOCUMENTS

| | | |
|---|---|---|
| 0 300 095 | 1/1989 | European Pat. Off. . |
| 0 485 167 | 5/1992 | European Pat. Off. . |
| 58-078937 | 5/1983 | Japan . |
| 63-82255 | 4/1988 | Japan . |
| 2-008133 | 1/1990 | Japan . |
| 3-211147 | 9/1991 | Japan . |
| 4-173643 | 6/1992 | Japan . |
| 4-277151 | 10/1992 | Japan . |
| 4-327445 | 11/1992 | Japan . |
| 0 536 885 | 4/1993 | Japan . |

*Primary Examiner*—David H. Bollinger
*Attorney, Agent, or Firm*—Fitzpatrick, Cella, Harper & Scinto

[57] ABSTRACT

The present invention provides a sheet conveying apparatus, and an image reading apparatus and an image forming apparatus having such a sheet conveying apparatus, in which skew correction of a sheet can be effected with high accuracy. A sheet convey means is provided at an upstream side of a skew correction means for correcting skew-feed of a sheet, and the sheet convey means is shifted by a shift means in a direction substantially perpendicular to the sheet conveying direction. A control means drives the shift means to shift the sheet convey means pinching the sheet to be skew-corrected by the skew correction means by a distance corresponding to a sheet skew amount on the basis of sheet skew amount information from a sheet skew amount detection means for detecting a skew amount of the sheet, thereby shifting the sheet in a skew correction direction.

34 Claims, 29 Drawing Sheets

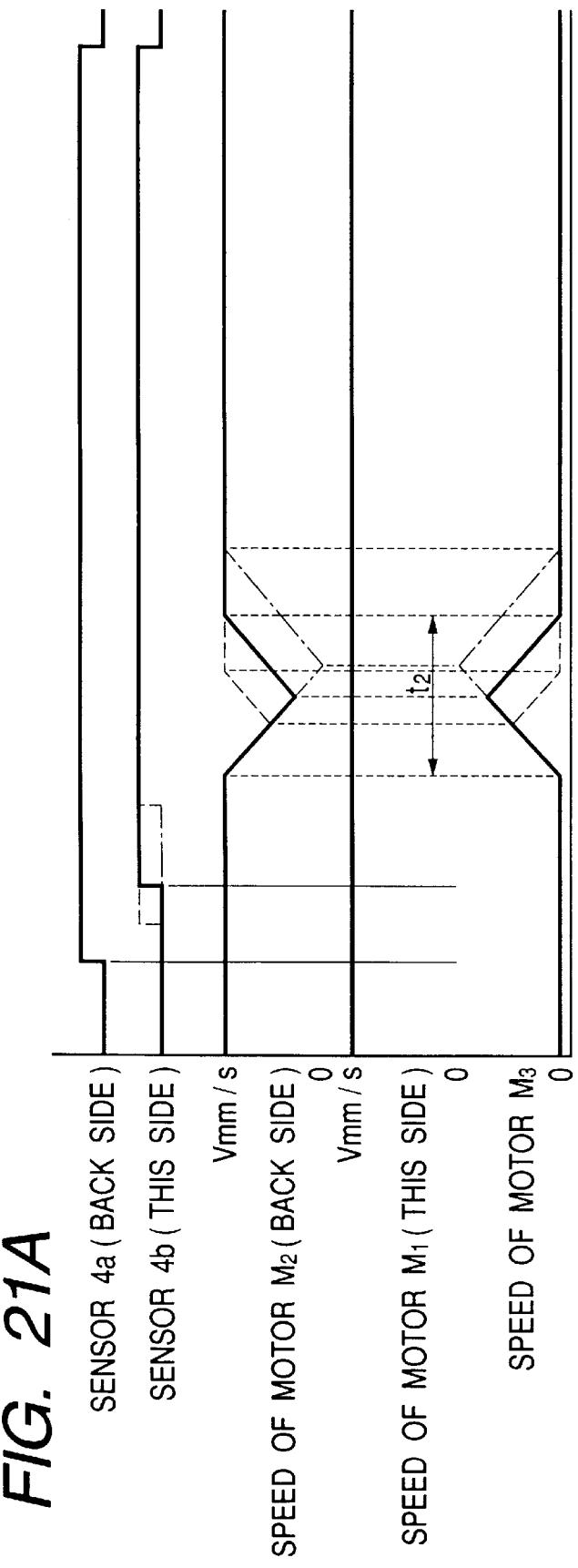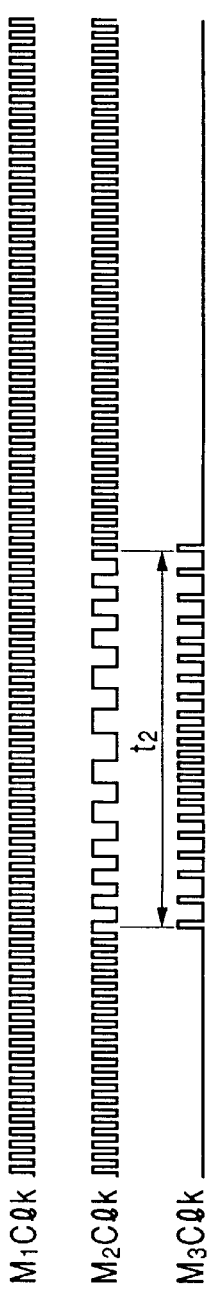

SHEET CONVEYING APPARATUS

BACKGROUND OF THE INVENTION

1. Field of the Invention

The present invention relates to a sheet conveying apparatus used with an image forming apparatus or an image reading apparatus such as a copying machine, a scanner, a printer and the like. More particularly, it relates to a sheet conveying apparatus having a skew correction means for correcting skew-feed of a sheet conveyed to an image forming portion or an image reading portion.

2. Related Background Art

In some conventional image forming apparatuses and image reading apparatuses such as copying machines, a printers or scanners, a regist means acting as a skew correction means for correcting skew-feed of a sheet is disposed in front of an image forming portion or an image reading portion in order to correct posture and position of a sheet.

Among such regist means, there is a loop regist means in which a tip end of a sheet abuts against a nip between a pair of regist rollers which are now stopped to form a loop in the sheet, so that skew-feed of the sheet is corrected by aligning the tip end of the sheet with the nip by elasticity of the sheet. As another regist means, there is a shutter regist means in which a shutter member for stopping the tip end of the sheet is retractably disposed in a sheet convey path and the skew-feed of the sheet is corrected by retarding the shutter member from the sheet convey path after the tip end of the sheet is aligned with the shutter member.

Recently, as the image forming apparatus and the image reading apparatus have been digitalized. For example in the image forming apparatus, a substantial image forming speed has been increased by treating many sheets for a short time without increasing a process speed of image formation by decreasing a distance between the sheets (sheet interval). On the other hand, in conventional analogue apparatuses (for example, copying machines), even when a copying operation is continued after a single sheet (original) is read, an optical device for exposing the original must be reciprocated by times corresponding to the number of copies, so that the distance between the sheets (sheet interval) is determined accordingly.

However, since the image reading and the image formation are digitalized, after the original is read once, image information of the original is electrically can be coded to be stored in a memory. And, in the image formation, the information in the memory is read out, and an image corresponding to the image information of the original is formed on a photosensitive member by an exposure device such as laser light or an LED array. To this end, even when a plurality of copies are formed, a mechanical movement of the optical device is not required.

As a method for reducing a time for the abovementioned registration which is one of factors for determining the distance between the sheets (sheet interval), there has been proposed an active regist method for correcting the skew-feed of the sheet while conveying the sheet without stopping the sheet temporarily.

In this method, two sensors are disposed in the sheet convey path with a predetermined distance therebetween along a direction substantially perpendicular to the sheet conveying direction so that inclination of the sheet can be detected on the basis of signals representing the fact that the tip end of the sheet is detected by the respective sensors, and, by controlling sheet conveying speeds of a pair of regist rollers which are disposed coaxially in a direction substantially perpendicular to the sheet conveying direction and spaced apart from each other with a predetermined distance therebetween and which are driven independently, the skew-feed of the sheet is corrected. By effecting the skew correction without stopping the sheet temporarily in this way, the distance between the sheets (sheet interval) can be reduced more than the other methods.

However, in the above-mentioned conventional sheet conveying apparatus, and the image reading apparatus and the image forming apparatus having such a sheet conveying apparatus, when sizes of sheets to be conveyed are not constant or identical (particularly, when a sheet having a long size is conveyed), the skew correction should be effected by the pair of regist rollers while a trail end of the sheet is being pinched between a pair of upstream convey rollers.

Further, in the active regist method, the skew correction is effected by advancing delayed side of the sheet with respect to one of the pair of regist rollers for skew correction or by delaying advanced side of the sheet with respect to the other of the pair of regist rollers. However, in both cases, rotational movement of the entire sheet is required. Thus, in the condition that the trail end of the sheet is pinched between the pair convey rollers, it is difficult to rotate the sheet by a required amount, which makes the accurate skew correction difficult. Further, depending upon the size of the sheet, sliding resistance of a sheet convey guide is increased to worsen accuracy of the skew correction.

SUMMARY OF THE INVENTION

The present invention aims to eliminate the above-mentioned conventional drawbacks, and an object of the present invention is to provide a sheet conveying apparatus, an image reading apparatus having such a sheet conveying apparatus, and an image forming apparatus having such a sheet conveying apparatus, in which skew correction can be effected with high accuracy.

Another object of the present invention is to provide a sheet conveying apparatus which includes a skew correction means for correcting skew-feed of a sheet and in which the sheet is conveyed while correcting the skew-feed of the sheet by the skew correction means, comprising at least one sheet convey means disposed upstream of the skew correction means in a sheet conveying direction for conveying the sheet to the skew correction means and being shiftable in a direction substantially perpendicular to the sheet conveying direction; a shift means for shifting the sheet convey means pinching the sheet in the direction substantially perpendicular to the sheet conveying direction to thereby shift the sheet to be skew-corrected by the skew correction means in a skew correction direction; a sheet skew amount detection means for detecting a skew amount of the sheet; and a control means for controlling driving of the shift means to shift the sheet convey means by an amount corresponding to the skew amount on the basis of sheet skew amount information from the sheet skew amount detection means.

Another object is to provide a sheet conveying apparatus which includes a skew correction mean for correcting skew-feed of a sheet and in which the sheet is conveyed while correcting the skew-feed of the sheet by the skew correction means, comprising a plurality of sheet convey means disposed upstream of the skew correction means in a sheet conveying direction to convey the sheet to the skew correction means and being shiftable in a direction substantially perpendicular to the sheet conveying direction; a plurality of shift means for shifting the sheet convey means pinching the sheet, respectively, in the direction substantially perpendicular to the sheet conveying direction to thereby shift the sheet before skew-corrected by the skew correction means in a skew correction direction; a sheet skew amount detection means disposed at the sheet convey means in the sheet conveying direction for detecting a skew amount of the sheet; and a control means for controlling driving of the plurality of shift means to shift the plurality of sheet convey means by amounts corresponding to the skew amount on the basis of sheet skew amount information detected by the sheet skew amount detection means.

Another object is to provide a sheet conveying apparatus further comprising at least one engageable/disengageable upstream sheet convey means disposed upstream of the sheet convey means in the sheet conveying direction; a sheet size detection means disposed upstream of the upstream side sheet convey means in the sheet conveying direction for detecting a length of the sheet in the sheet conveying direction; and an engagement/disengagement control means for selectively effecting engagement or disengagement of the upstream sheet convey means on the basis of sheet length information detected by the sheet size detection means.

Another object is to provide a sheet conveying apparatus wherein the plurality of sheet convey means are arranged side by side along a direction substantially perpendicular to the sheet conveying direction, and the control means controls the respective sheet convey means independently on the basis of sheet skew amount information detected by the sheet skew amount detection means; wherein the position control of the sheet convey means is effected to coincide with movement of the sheet in the sheet skew correction direction during the skew correction; and wherein the position control of the sheet convey means is effected during the skew correction performed by the skew correction means.

Another object is to provide a a sheet conveying apparatus wherein an enlarged portion is formed in a part of a sheet convey path for conveying the sheet from the sheet convey means to the skew correction means; wherein a part of walls defining a sheet convey path for conveying the sheet from the sheet convey means to the skew correction means is constituted by a rockable member; and further comprising a sheet end detection means disposed in the vicinity of the sheet convey means for detecting an end of the sheet, and wherein the control means controls the shifting movement of the sheet convey means until the end of the sheet is detected by the sheet end detection means.

Another object is to provide a a sheet conveying apparatus wherein the control means controls the shifting movement of the sheet convey means from when the sheet is pinched by the sheet convey means till when the tip end of the sheet reaches the skew correction means; further comprising a sheet thickness detection means disposed upstream of the sheet convey means in the sheet conveying direction for detecting a thickness of the sheet, and wherein the control means controls the shifting movement of the sheet convey means on the basis of sheet thickness information detected by the sheet thickness detection means and the sheet skew amount information; and further comprising a sheet size detection means disposed upstream of the sheet convey means in the sheet conveying direction for detecting a size of the sheet, and wherein the control means controls the shifting movement of the sheet convey means on the basis of sheet size information detected by the sheet size detection means and the sheet skew amount information.

Another object is to provide an image reading apparatus wherein the sheet conveying apparatus according to one of claims 1 to 12 is disposed upstream of an image reading portion in the sheet conveying direction; and wherein the sheet conveying apparatus according to one of claims 1 to 12 is disposed at an upstream side of an image forming portion in the sheet conveying direction.

Further, as is in the present invention, the sheet convey means is disposed at an upstream side of the skew correction means for correcting the skew-feed of the sheet in the sheet conveying direction and the sheet convey means can be shifted by the shift means in a direction substantially perpendicular to the sheet conveying direction. And, on the basis of the sheet skew amount information from the sheet skew amount detection means for detecting the skew amount of the sheet, the control means controls the driving of the shift means to shift the sheet convey means (pinching the sheet to be skew-corrected by the skew correction means) by a distance corresponding to the skew amount of the sheet, to thereby shift the sheet toward the skew correction direction.

Further, by applying the sheet conveying apparatus to an original image reading apparatus or an image forming apparatus, in apparatuses having the same conveying speed, the number of sheets to be treated per unit time can be increased, thereby improving productivity.

BRIEF DESCRIPTION OF THE DRAWINGS

FIGS. 21A and 21B are timing charts showing thrust shift control in an image reading apparatus according to a ninth embodiment of the present invention;

DETAILED DESCRIPTION OF THE PREFERRED EMBODIMENTS

The present invention will now be explained in connection with embodiments thereof with reference to the accompanying drawings.

Figure 1:
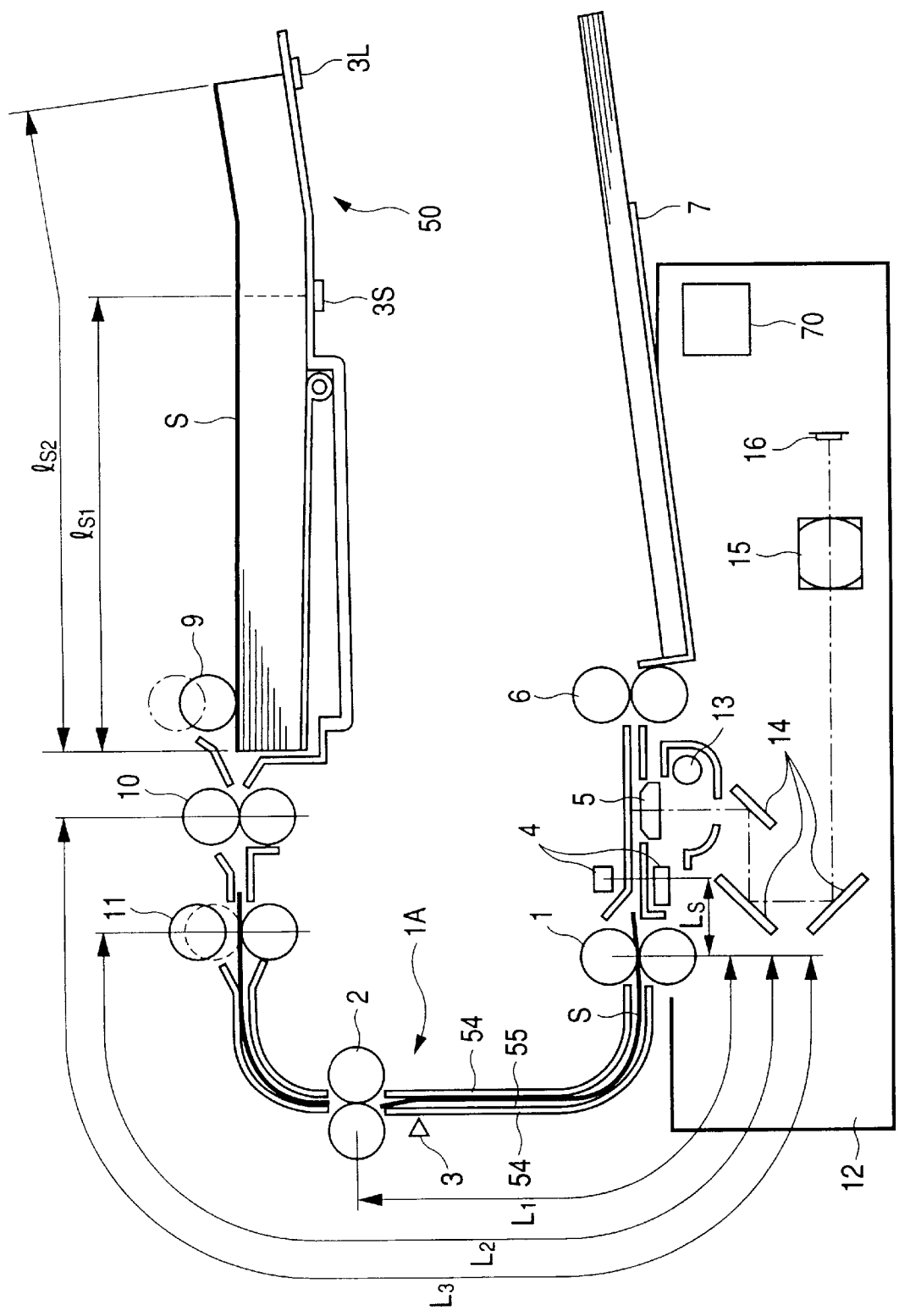
FIG. 1 is a sectional view of an image reading apparatus having a sheet conveying apparatus according to a first embodiment of the present invention.

In FIG. 1 showing a sectional view of an image reading apparatus having a sheet conveying apparatus according to a first embodiment of the present invention, the reference numeral 1A denotes a sheet conveying apparatus; 1 denotes a pair of regist rollers constituting a skew correction means (regist means) for effecting skew correction of a sheet (original) to correct posture and position of the sheet in front of an image reading portion; and 4 denotes pass detect sensors for detecting passage of the sheet. The pair of regist rollers 1 and the pass detect sensor 4 will be described later with reference to FIG. 3.

The reference numeral 5 denotes a reading glass for reading an image on the original; 6 denotes a pair of discharge rollers; and 7 denotes a discharge tray. The originals S are contained in a sheet supply portion 50 with imaged surfaces facing upwardly. The reference numeral 9 denotes a pick-up roller coated by material (such as rubber) having relatively high coefficient of friction; and 10 denotes a pair of separation/supply rollers for separating the originals (fed by the pickup roller 9) one by one.

The reference numeral 11 denotes a first pair of original convey rollers (upstream side sheet convey means) disposed at a down stream side of the pair of separation/supply rollers and engageable with and disengageable from each other and normally contacted with each other (described later); and 3S and 3L denote original length detect sensors (sheet size detect means) for detecting lengths $l_{S1}$ and $l_{S2}$ of the original S in a conveying direction, which sensors are photoelectric sensors of reflection type for detecting the length of the original S in the conveying direction when the originals are set. Detection signals from the original length detect sensors 3S, 3L are inputted to a control device 70.

The reference numeral 2 denotes a second pair of original convey rollers (sheet convey means) which will be described later fully. An original detect sensor 3 is disposed near and at a down stream side of the pair of original convey rollers 2, where presence/absence of the original is detected.

Symbols $L_1$, $L_2$ and $L_3$ represent distances from the pair of regist rollers 1 to the second pair of original convey rollers 2, the first pair of original convey rollers 11 and the pair of separation/supply rollers 10, respectively, and, regarding the original lengths $l_{S1}$ and $l_{S2}$, the following relations are established:

$$L_1 < l_{S1} \text{ and, } L_2 < l_{S2} < L_3.$$

Further, regarding the original lengths $l_{S1}$ and $l_{S2}$, lengths obtained by adding a distance Ls between the pair of regist rollers 1 and the pass detect sensor 4 to the above-mentioned distances $L_1$, $L_2$, $L_3$ have the following relation:

$$(L_1+L_S) < l_{S1} < (L_2+L_S) < l_{S2} < L_3.$$

Figure 2:
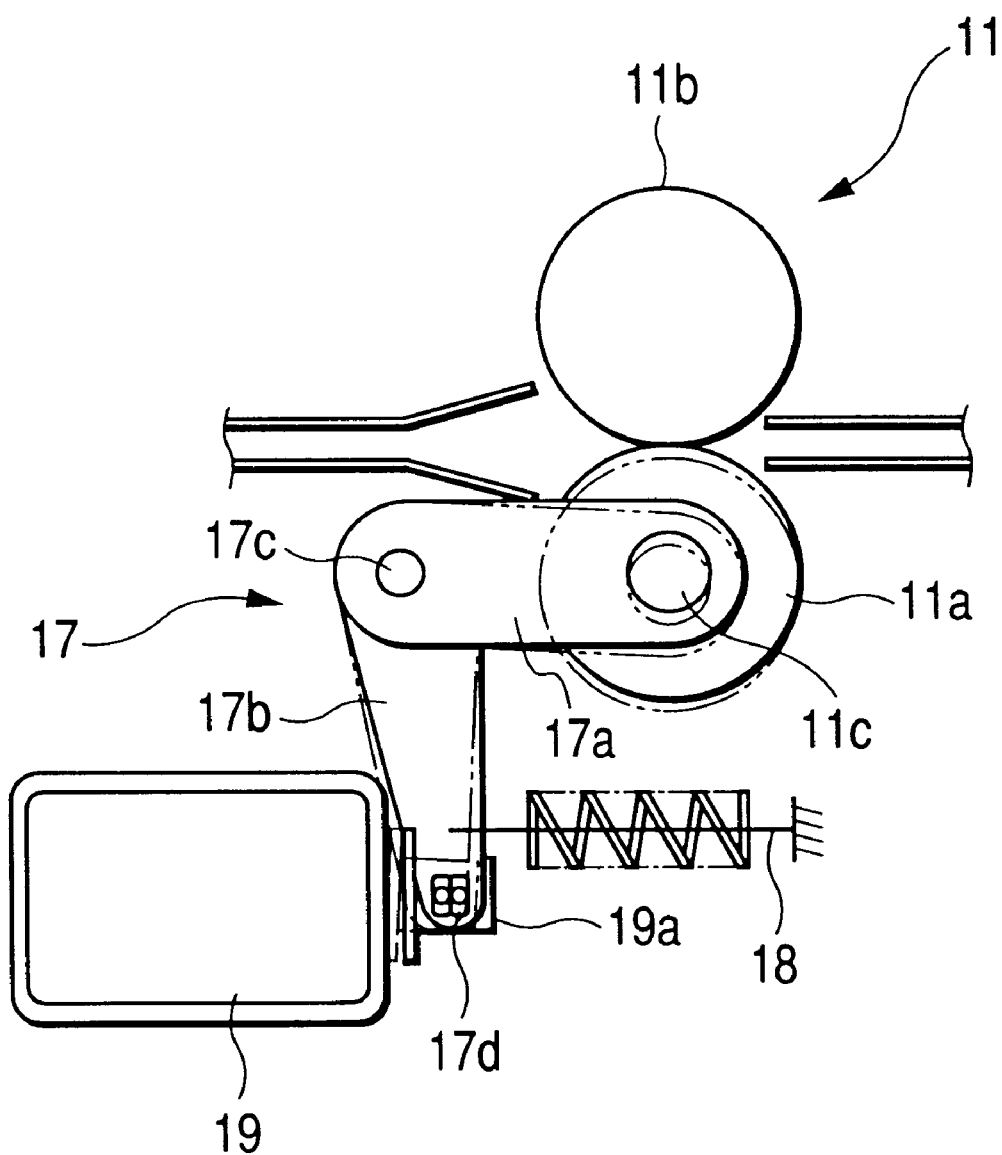
FIG. 2 is an explanatory view showing an engagement/disengagement mechanism for a first pair of original convey rollers of the sheet conveying apparatus.

In FIG. 2 showing an engagement/disengagement mechanism for the first pair of original convey rollers 11, an L-shaped lever has a first arm member 17a and a second arm member 17b and can be rotated around a rotation shaft 17c. The first arm member 17a of the lever 17 is connected to a central shaft 11c of an original convey roller 11a of the first original convey roller pair 11. An elongated slot 17d is formed in a free end portion of the second arm member 17b of the lever 17, and a solenoid 19 is connected to the slot 17d via an actuator 19a. A position of the actuator is controlled by the solenoid 19 and a return spring 18 so that, when the solenoid 19 is turned OFF, the actuator is shifted to the right in FIG. 2 by a spring force of the return spring, while when the solenoid 19 is turned ON, the actuator is shifted to the left in FIG. 2 by an electromagnetic attracting force.

In this engagement/disengagement mechanism for the first pair of original convey rollers 11, when the solenoid 19 is turned OFF, the lever 17 is rotated in an anti-clockwise direction via the shaft 17c by the spring force of the return spring 18, so that the original convey roller 11a is urged against an original convey roller 11b (the other roller of the first original convey roller pair 11) (as shown by the solid line in FIG. 2). On the other hand, when the solenoid 19 is turned ON, the actuator 19a is shifted to the left in opposition to the spring force of the return spring 18, so that the lever is rotated in a clockwise direction, to thereby separate the original convey roller 11a from the original convey roller 11b (as shown by the two dot and chain in FIG. 2).

The switching between engagement and disengagement of the first pair of original convey rollers 11 due to ON/OFF of the solenoid 19 is effected by the control device (engagement/disengagement control means) on the basis of the length of the original S. That is to say, when the original being conveyed has small length $l_{S1}$, the first pair of original convey rollers 11 are engaged with each other during a skew correcting operation (described later), because movement of the original in a rotational direction is not obstructed since the trail end of the original has already been passed through a nip of the first original convey roller pair 11. On the other hand, when the original being conveyed has great length $l_{S2}$, since the trail end of the original has not yet been passed through a nip of the first original convey roller pair 11, the first pair of original convey rollers 11 are disengaged from each other not to obstruct the movement of the original in the rotational direction.

Incidentally, in FIG. 1, the reference numeral 12 denotes a scanner portion for reading-in the image on the original; 13 denotes an illumination lamp for illuminating the imaged surface of the original being moved on the reading glass 5; 14 denotes mirrors; 15 denotes a lens; and 16 denotes an image reading element such as a CCD.

Figure 3:
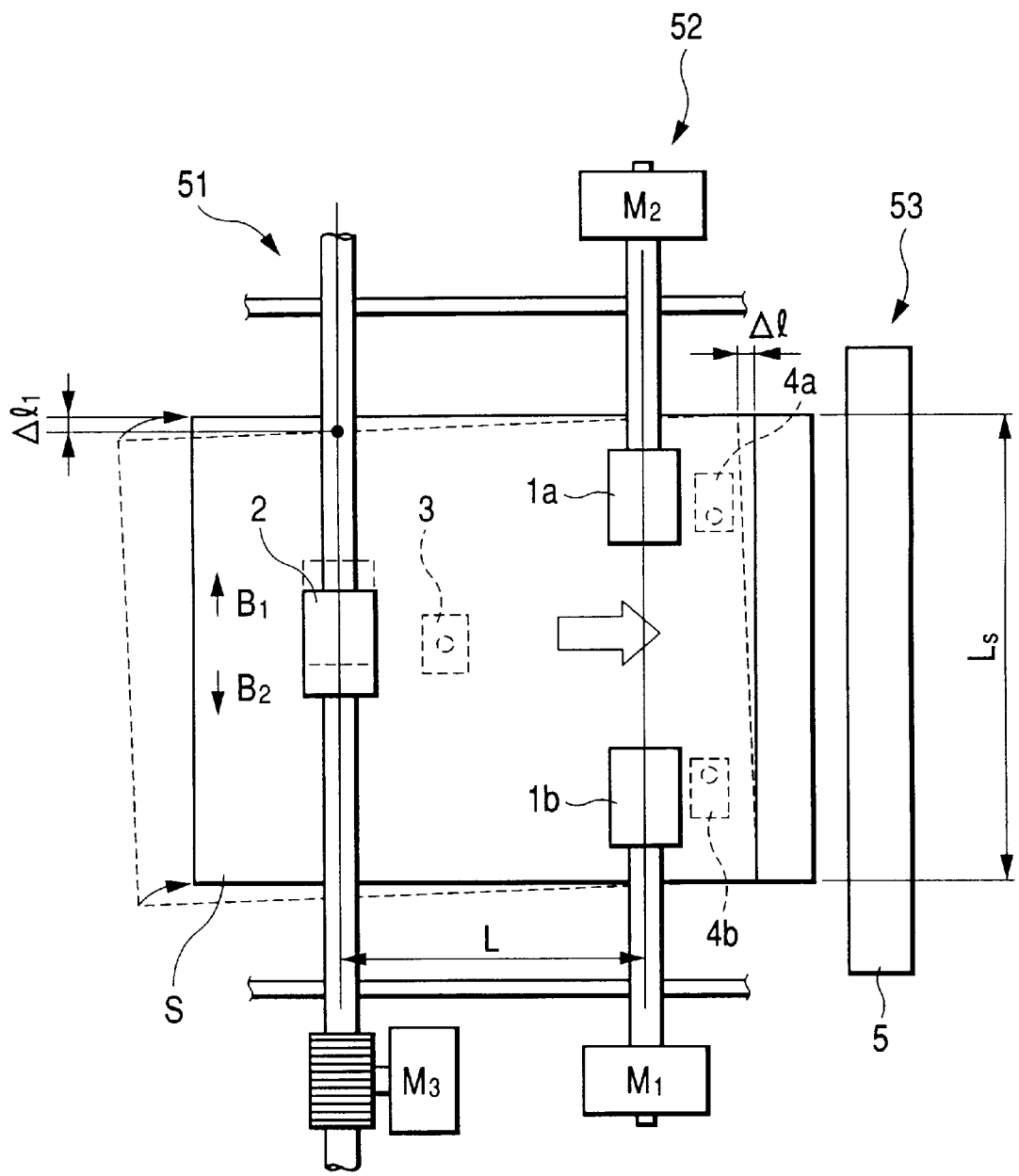
FIG. 3 is a plan view a skew correction portion of the sheet conveying apparatus.

FIG. 3 is an explanatory view showing an original convey portion 51, a regist portion 52 and an image reading portion 53. In FIG. 3, regist rollers 1*a* and 1*b* (constituting the regist roller pair 1) are spaced apart from each other with a predetermined distance therebetween along a direction substantially perpendicular to a conveying direction shown by the fat arrow and are driven by independent first and second drive motors $M_1$ and $M_2$, respectively.

The pass detect sensors 4*a*, 4*b* of light permeable type (skew amount detection means) are spaced apart from each other with a predetermined distance therebetween along the direction substantially perpendicular to the conveying direction to detect a skew amount of the original S by detecting the tip end of the original S conveyed through a sheet convey path 55 defined between convey guides 54. When the two pass detect sensors 4*a* and 4*b* detect the tip end of the original S, the sensors generate detection signals which are in turn inputted to the control device 70. The control device 70 determines the skew amount of the original S on the basis of the detection signals (skew amount information).

Figure 4:
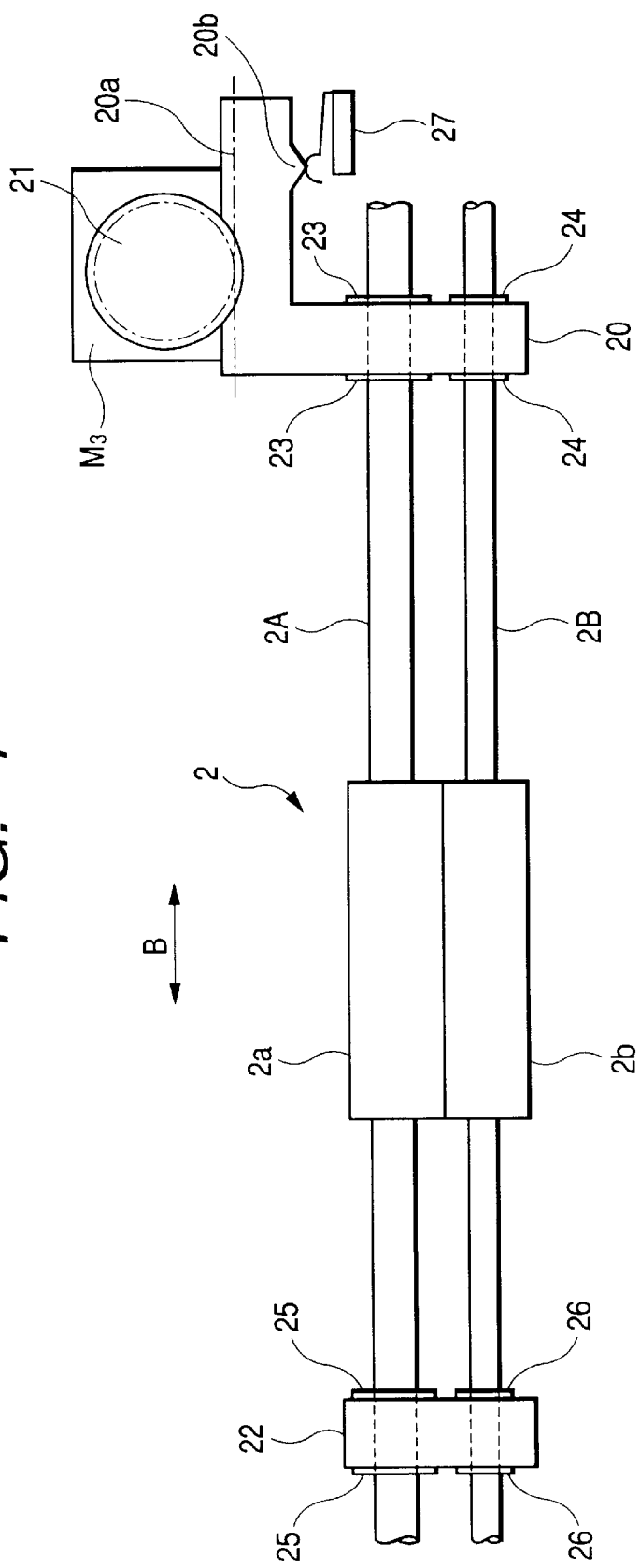
FIG. 4 is a plan view showing a shift mechanism for a second pair of convey rollers of the sheet conveying apparatus.

The second pair of original convey rollers 2 are disposed at an upstream side of the regist roller pair 1 in the conveying direction, and a thrust position of the second original convey roller pair 2 can be controlled. As shown in FIG. 4, the second original convey roller pair 2 includes a convey roller 2*a* and a driven roller 2*b*. The convey roller 2*a* is rotatably supported by a frame (not shown) for shifting movement in a thrust direction (shown by the arrow B in FIG. 4), and the driven roller 2*b* is urged against the convey roller 2*a* by a biasing means (not shown). Roller shafts 2A, 2B of the convey roller 2*a* and the driven roller 2*b* are rotatably supported by bearings 20, 22, respectively, and are regulated by slide regulating members 23, 24, 25 and 26 in the thrust direction. With this arrangement, the convey roller 2*a* and the driven roller 2*b* can integrally be shifted in the thrust direction.

The bearing 20 is provided with a rack gear 20*a* meshed with a pinion gear 21 provided on a third drive motor (shift means) $M_3$ for shifting the second original convey roller pair 2, so that the shifting of the convey rollers 2*a*, 2*b* in the thrust direction (shown by the arrow B in FIG. 4) can be controlled in accordance with a rotation amount of the third drive motor $M_3$. The driving of the third drive motor $M_3$ is controlled by the control device 70 shown in FIG. 5.

Figure 5:
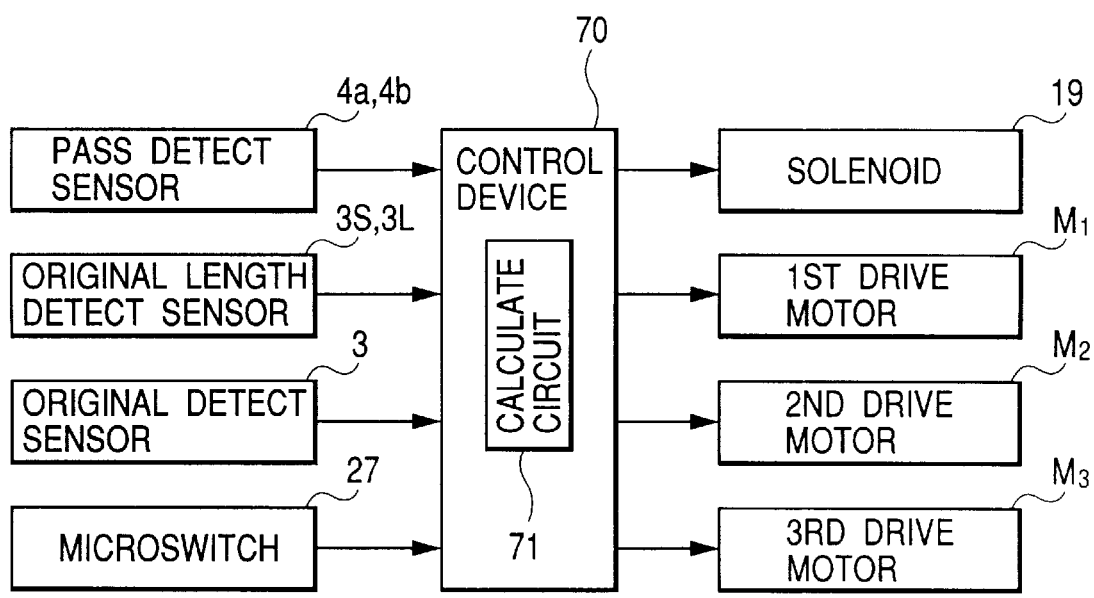
FIG. 5 is a block diagram of a control device of the image reading apparatus.

Further, the bearing 20 is provided at its one end with a projection 20*b* and a microswitch 27 is disposed in a confronting relation to the projection, so that home positions of the bearing 20 and the convey roller pair 2*a*, 2*b* in the thrust direction can be detected by the projection 20*b* and the microswitch 27. When the bearing 20 and the convey roller pair 2*a*, 2*b* are shifted to their home positions, the microswitch 27 is turned ON, and an ON signal from the microswitch is inputted to the control device 70, as shown in FIG. 5.

Next, the skew correcting operation of the image reading apparatus will be explained.

First of all, when the originals S are set on the sheet supply portion 50, the size of the original (original length) is detected by the original length detect sensors 3S, 3L, and the detection signals are inputted to the control device 70. If the original S has small length, the control device 70 turns the solenoid 19 OFF to achieve the engagement condition of the first original convey roller pair 11; whereas, if the original S has great length, the control device 70 turns the solenoid 19 ON to achieve the disengagement condition of the first original convey roller pair 11.

Then, when a start button (not shown) is depressed, the pick-up roller 9 is rotated by a drive mechanism (not shown) to fed out an uppermost original on the original stack S toward the pair of separation/supply rollers 10. When the single original is fed out, the pair of separation/supply rollers 10 feeds the original toward a downstream side as it is; whereas, if two or more originals are fed out, the lower roller (in the separation/supply roller pair 10) is rotated in a direction opposite to the feeding direction to separate the originals, to thereby convey only the uppermost original S toward the downstream side. Since the separation mechanism does not directly relate to the present invention, detailed explanation thereof will be omitted.

Thereafter, the original S is conveyed to the regist roller pair 1 through the original convey path 55 by the first and second pairs of convey rollers 2, 11 (or only by the second pair of convey rollers 2 when the original has great length $l_{S2}$). The pair of regist rollers 1 are rotated at the same speeds as the original conveying speeds of the first and second pairs of convey rollers 2, 11 so that the original S pinched between the pair of regist rollers 1 is conveyed toward the image reading portion 53 as it is; meanwhile, the original passes through the pass detect sensors 4*a*, 4*b*.

The detection signal (from the pass detect sensors 4*a*, 4*b*) representing the fact that the original S is passed through these sensors is inputted to the control device 70. In the control device 70, first of all, inclination of the tip end of the original S is calculated by a calculate circuit 71 on the basis of the detection signals. Then, the rotational speeds of the regist rollers 1*a*, 1*b* and the first and second drive motors $M_1$, $M_2$ are controlled on the basis of the calculated inclination. Incidentally, in the illustrated embodiment, for example, in case of FIG. 3, the regist roller 1*b* relating to the advanced side of the original is delayed (i.e., the rotational speed of the first drive motor $M_1$ is delayed) to correct the skew-feed.

At the same time, in the control device 70, a shift control amount (described later) of the second original convey roller pair 2 is calculated by the calculate circuit 71 on the basis of the inclination of the tip end of the original S, and, by rotating the third drive motor $M_3$ by a required amount, the control is effected so that the thrust position of the second original convey roller pair 2 is shifted. For example, in case of FIG. 3, the second original convey roller pair 2 is shifted by an amount of $\Delta l_1$ in the direction (shown by the arrow $B_1$ in FIG. 3) substantially perpendicular to the sheet conveying direction. As a result, the original S being skew-corrected by the regist roller pairs 1 is shifted in the direction substantially perpendicular to the sheet conveying direction, thereby effecting the skew correction with high accuracy.

When the original S being conveyed has small length, during the shifting movement of the original, since the trail end of the original S has already been passed through the nip of the first original convey roller pair 11, the movement of the original S during the skew correction is not obstructed. Even when the original S being conveyed has great length, since the first original convey roller pair 11 is previously set to the disengagement condition, the movement of the original S during the skew correction is not obstructed similarly.

The shift amount $\Delta l_1$ of the second original convey roller pair 2 is approximately represented by the following equation, when the inclination of the tip end of the original S is l, a distance between the regist roller pair 1*a*, 1*b* and the second original convey roller pair 2 is L and a width of the original S is $L_S$:

$$\Delta l_1 = L/L_S \times \Delta l.$$

By shifting the second original convey roller pair 2 in the thrust direction in this way, the skew-corrected original S reaches the reading glass 5, where the image on the original is read.

Thereafter, the trail end of the original S is detected by the original detect sensor 3. When it is judged that the trail end of the original is passed through the second original convey roller pair 2 on the basis of the detection signal from the original detect sensor 3, the third drive motor $M_3$ is rotated reversely by the control device 70. Due to the reverse rotation of the third motor $M_3$, the second original convey roller pair 2 is shifted to a direction shown by the arrow $B_2$, and the projection 20b of the bearing 20 is shifted to the home position to turn the microswitch 27 ON. As a result, in response to the ON signal from the microswitch 27, the control device 70 stops the driving of the third drive motor $M_3$ for preparation for next skew correction of original.

When the skew correction is effected by the regist rollers 1a, 1b in this way, by controlling the thrust position of the second original convey roller pair 2, the movement of the entire original in the rotational direction (skew correction direction) is promoted, and, by not obstructing the movement of the original, the skew correction can be achieved with high accuracy.

In the illustrated embodiment, while an example that one pair of engageable/disengageable original convey rollers are used was explained, a plurality of pairs of such convey rollers may be used. Further, the rotational speed of the third drive motor $M_3$ and the start/stop timing of the rotation of the third drive motor $M_3$ are most preferably depended upon the rotational direction movement of the original S given by the first and second drive motors $M_1$, $M_2$ during the skew correction, but may be selected to be finished at least during the skew correction effected by the first and second drive motors $M_1$, $M_2$.

If the rotational direction movement of the original S during the skew correction does not coincide with the speed and timing of the thrust direction movement of the second original convey roller pair 2 given by the third motor $M_3$, flexion is generated in the original during the skew correction due to torsion of the original, so that the sliding resistance between the original and the convey guides 54 is increased, to thereby worsen the accuracy of skew correction.

Figure 6:
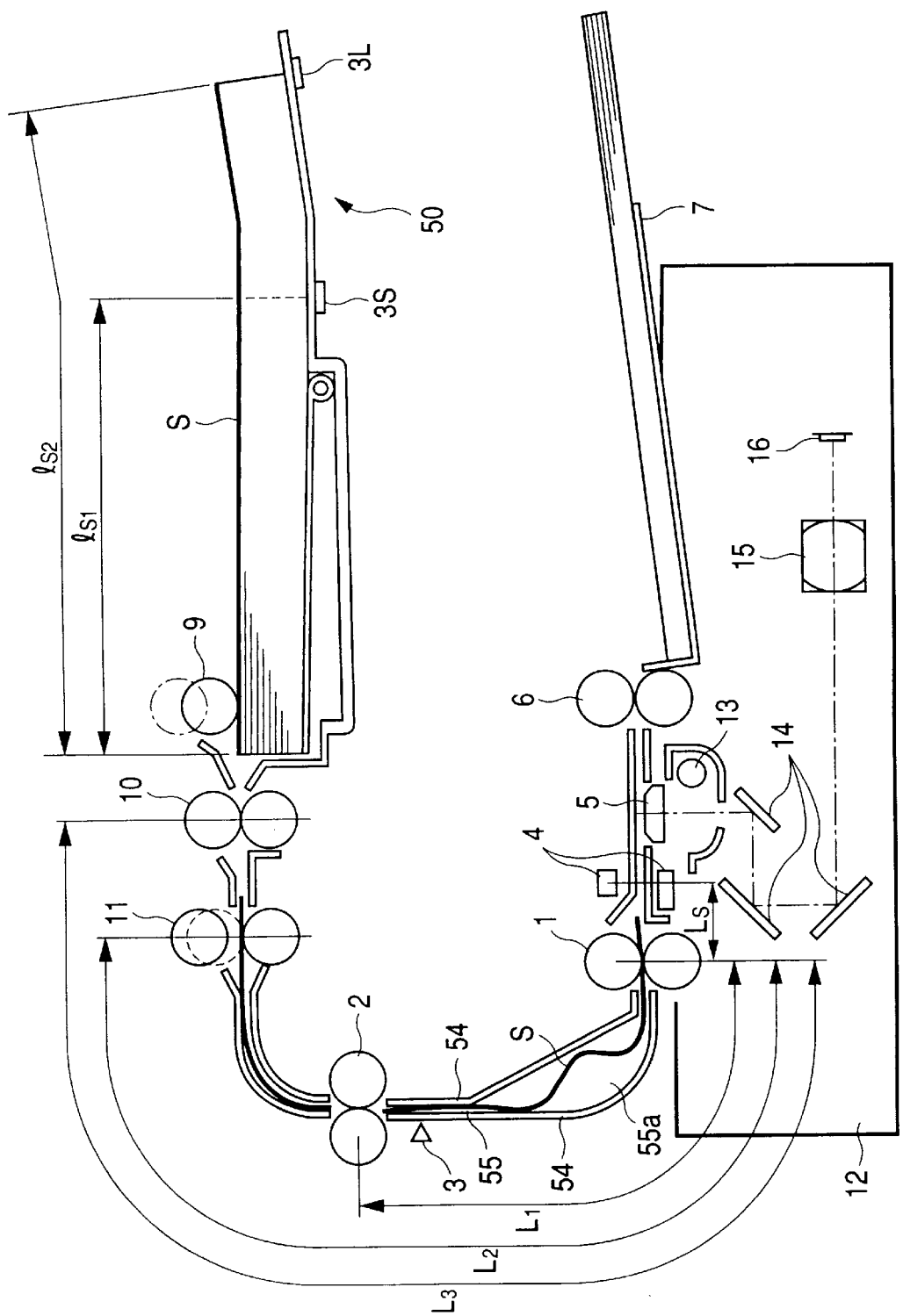
FIG. 6 is a sectional view of an image reading apparatus having a sheet conveying apparatus according to a second embodiment of the present invention.

If it is guessed that such a case occurs, in an image reading apparatus having a sheet conveying apparatus according to a second embodiment of the present invention shown in FIG. 6, by providing a widened portion 55a in the sheet convey path 55 between the second original convey roller pair 2 and the regist roller pair 1, the flexion of the original S may be absorbed to reduce the sliding resistance.

Figure 7:
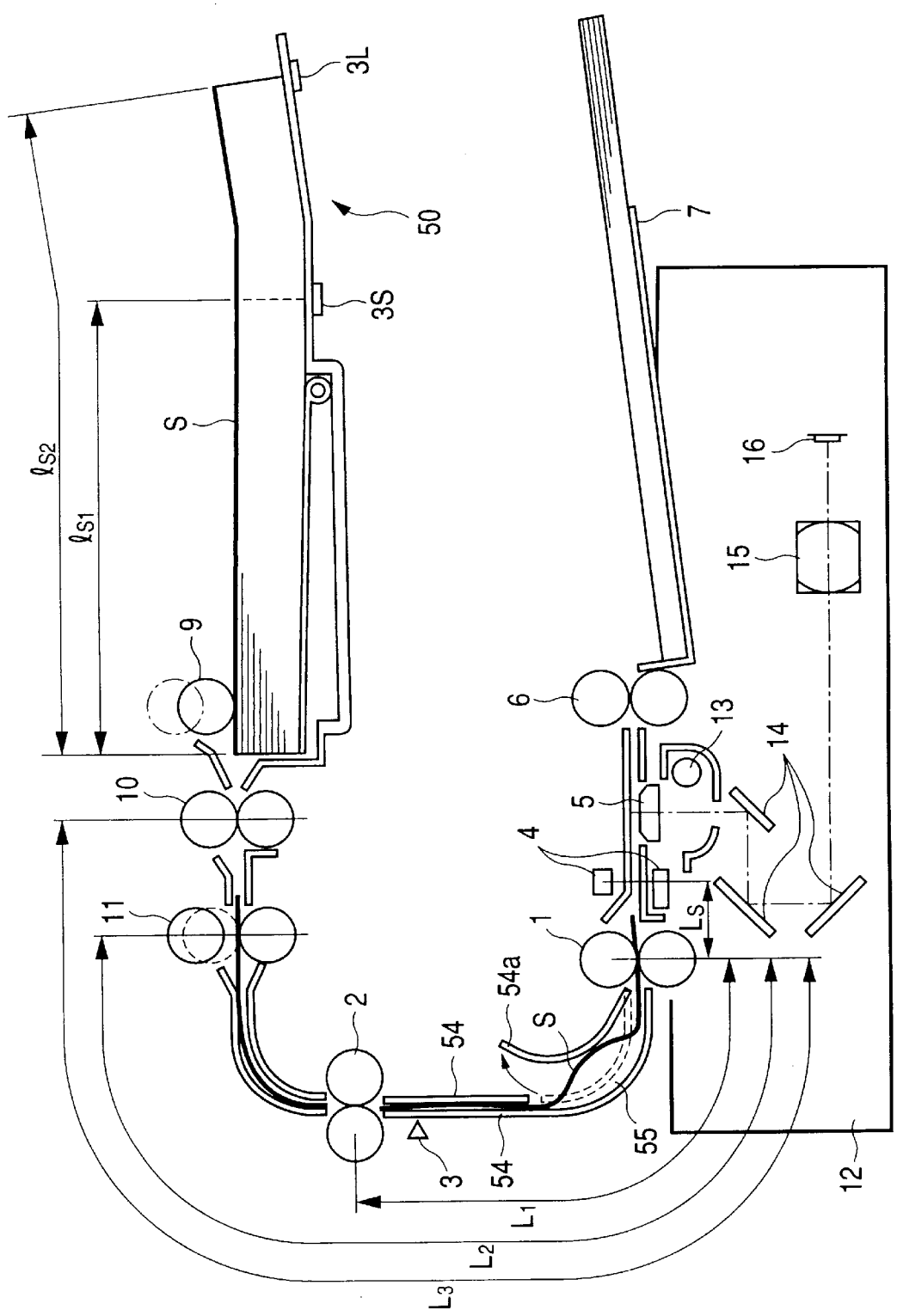
FIG. 7 is a sectional view of an image reading apparatus having a sheet conveying apparatus according to a third embodiment of the present invention.

Further, as shown in FIG. 7, in an image reading apparatus having a sheet conveying apparatus according to a third embodiment of the present invention, by providing a rockable member 54a forming a part of the guide members 54 defining the sheet convey path 55 between the second original convey roller pair 2 and the regist roller pair 1, the flexion of the original S may be released.

On the other hand, if the original has large size or/and a thickness (rigidity) of the original S is great, it is guessed that the accuracy of the skew correction is worsened. That is to say, in such a case, since the sliding resistance between the original and the guides 54 is increased, in dependence upon a pressurizing force and material of the second original convey roller pair 2 and surface features of the guides 54, even when the second original convey roller pair 2 is shifted in the thrust direction during the skew correction, the original S is slipped in the nip of the second original convey roller pair 2, so that the thrust direction movement of the second original convey roller pair 2 does not become coincidence with the movement of the original S. In such a case, by using either or both of original size information obtained by the original size detect sensor and original thickness information obtained by the original thickness detect sensor as parameters and by considering the slip between the second original convey roller pair 2 and the original S, the shift amount of the second original convey roller pair 2 may be determined and controlled.

Figure 8:
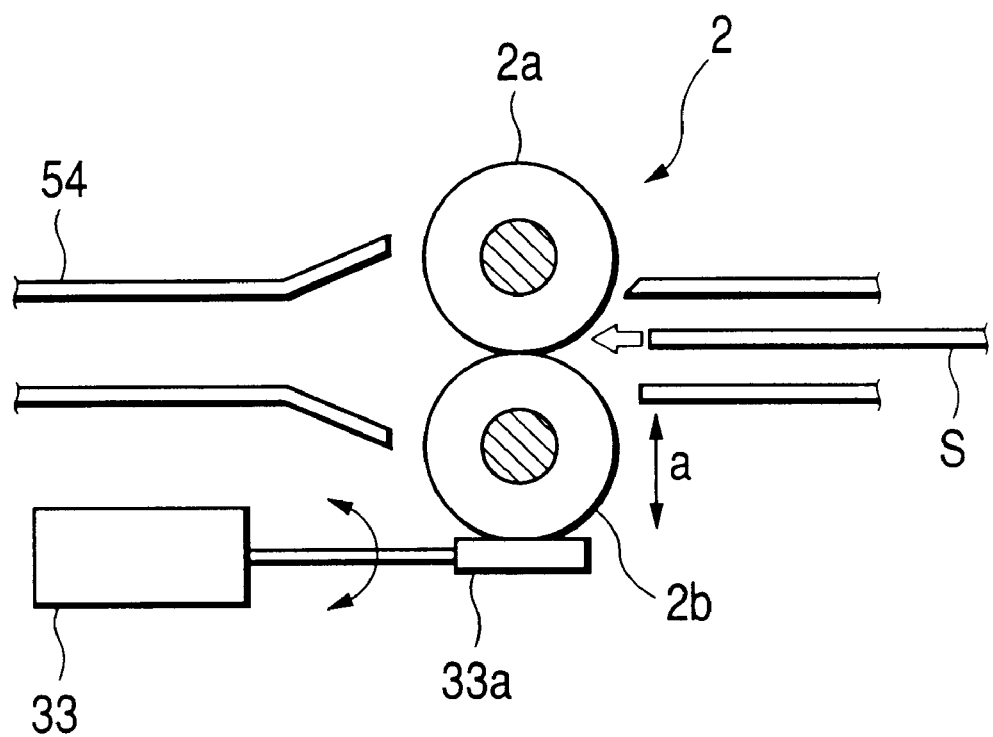
FIG. 8 is a sectional view showing an original thickness detection portion of an image reading apparatus having a sheet conveying apparatus according to a fourth embodiment of the present invention.

Incidentally, FIG. 8 is a view showing an example of an original thickness detect sensor (sheet thickness detect sensor) 33 (for effecting the above control) in an image reading apparatus having a sheet conveying apparatus according to a fourth embodiment of the present invention. The sensor 33 is constituted by a potentiometer of no contact type and is disposed in the vicinity of the second original convey roller pair 2.

When the tip end of the original S enters into the nip of the second original convey roller pair 2, the original S is shifted to the left as shown by the fat arrow in FIG. 8 while lowering the driven roller 2b in opposition to the biasing force of the spring (not shown). In this case, a shift amount of the driven roller 2b corresponds to a thickness of the original S, and a movable element 33a of the potentiometer as the original thickness detect sensor 33 can follow the movement of the driven roller 2b in the engagement/disengagement direction (shown by the arrow a). The potentiometer outputs a voltage value corresponding to the movement of the movable element 33a, and, in the control device 70, on the basis of the voltage value, the thickness of the original S is judged and the shift amount of the second original convey roller pair 2 is determined.

Incidentally, when such a potentiometer is used, by checking a relation between the thickness of the original S and the voltage value outputted from the potentiometer previously, the thickness of the original S can be determined on the basis of the voltage value outputted from the potentiometer.

Figure 9:
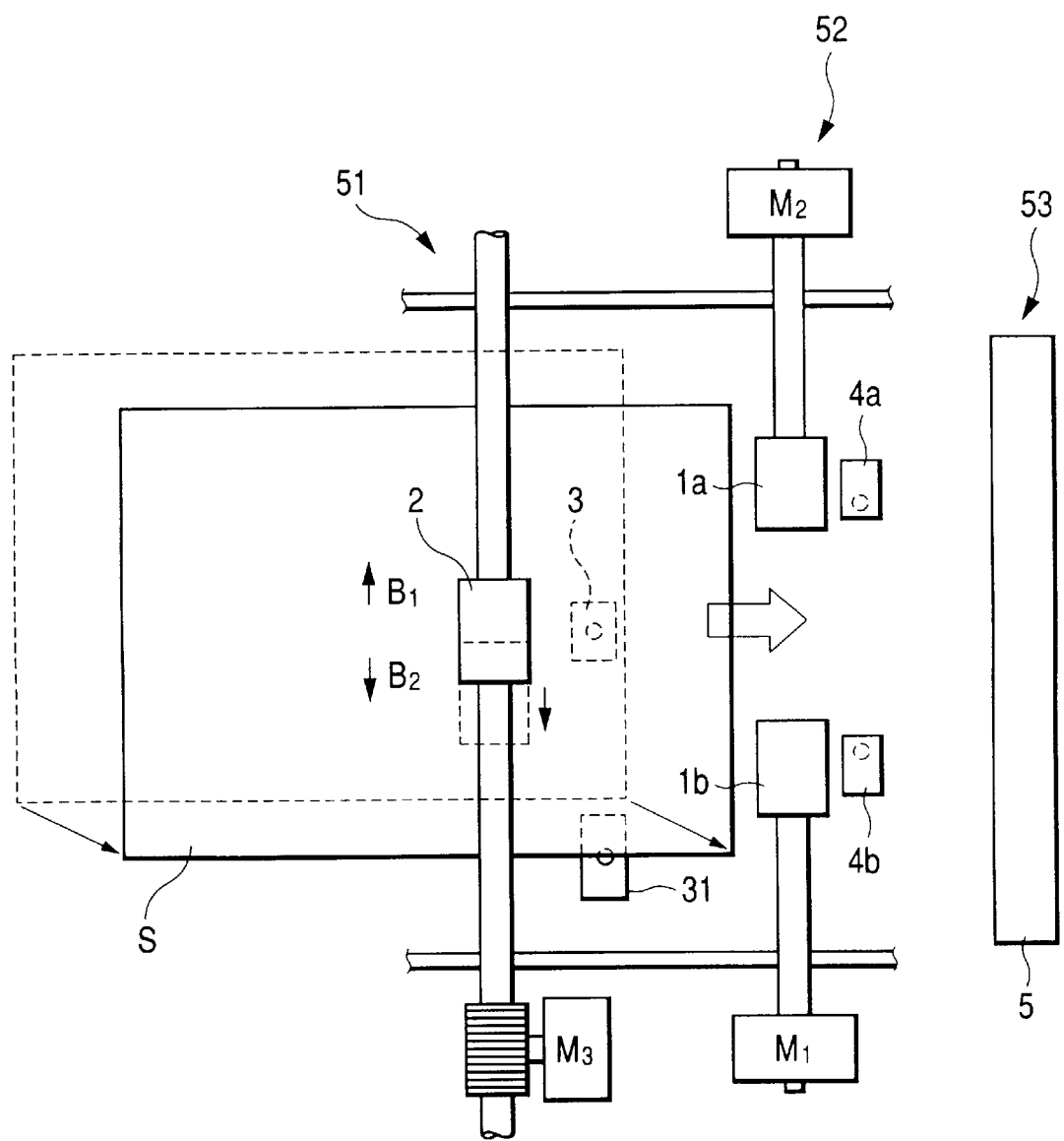
FIG. 9 is a plan view of a skew correction portion of an image reading apparatus having a sheet conveying apparatus according to a fifth embodiment of the present invention.

Next, an image reading apparatus having a sheet conveying apparatus according to a fifth embodiment of the present invention will be explained with reference to FIG. 9 which is a plan view of a skew correction portion of the sheet conveying apparatus. In FIG. 9, the same elements as those shown in FIG. 3 are designated by the same reference numerals and detailed explanation thereof will be omitted.

A sensor 31 of permeable type (referred to as "lateral regist sensor" hereinafter) as a sheet end detect means disposed at a predetermined position in the vicinity of and at a downstream side of the second original convey roller pair 2 is arranged side by side with the original detect sensor 3 in the direction substantially perpendicular to the conveying direction and in the vicinity of the end of the original stack. The lateral regist sensor 31 serves to detect the end of the original S when the tip end of the original S reaches the original detect sensor 3, and a detection signal from the lateral regist sensor is inputted to the control device 70.

More specifically, the lateral regist sensor 31 outputs the detection signal when the original S is positioned above (or below) the lateral regist sensor 31. When the tip end of the original S being conveyed reaches the original detect sensor 3, if the presence of the original is detected by the lateral regist sensor 31, the third drive motor $M_3$ is rotated to shift the second original convey roller pair 2 in the direction $B_1$. On the other hand, when the end of the original reaches the lateral regist sensor 31 to detect the absence of the original by the lateral regist sensor 31, on the basis of the change in detection signal, the control device 70 judges that the end of the original reaches the lateral regist sensor 31 and stops the driving of the third drive motor $M_3$.

To the contrary, when the tip end of the original S being conveyed reaches the original detect sensor 3, if the absence of the original is detected by the lateral regist sensor 31, the detection signal is outputted to the control device 70, so that the control device 70 rotates the third drive motor $M_3$ to shift the second original convey roller pair 2 in the direction $B_2$. In this case, since the original S is pinched by the nip of the second original convey roller pair 2, the original is shifted in the direction $B_2$ together with the second original convey roller pair 2. Thereafter, when the end of the original reaches the lateral regist sensor 31 to detect the presence of the original by the lateral regist sensor 31 and the detection signal from the lateral regist sensor 31 is inputted to the control device 70, the control device 70 judges that the end of the original reaches the lateral regist sensor 31 and stops the driving of the third drive motor $M_3$.

The positions of the sensors 3, 31 and the control number of revolutions of the third drive motor $M_3$ are selected so that such controls are finished before the tip end of the original S reaches the nip of the regist roller pair 1. With the above-mentioned arrangement and controls, while the original S is being pinched by the nip of the regist roller pair 1, the end of the original S is always positioned in the lateral regist sensor portion 31, thereby permitting the lateral registration.

In the illustrated embodiment, while an example that the single lateral regist sensor 31 is used was explained, a plurality of lateral regist sensors may be provided in accordance with the original size (length in the lateral direction) or the lateral regist sensor may be shifted in accordance with the original size or the lateral regist sensor may be set at any position by the operator.

Next, an image reading apparatus having a sheet conveying apparatus according to a sixth embodiment of the present invention will be explained with reference to FIGS. 10 and 11.

Figure 10:
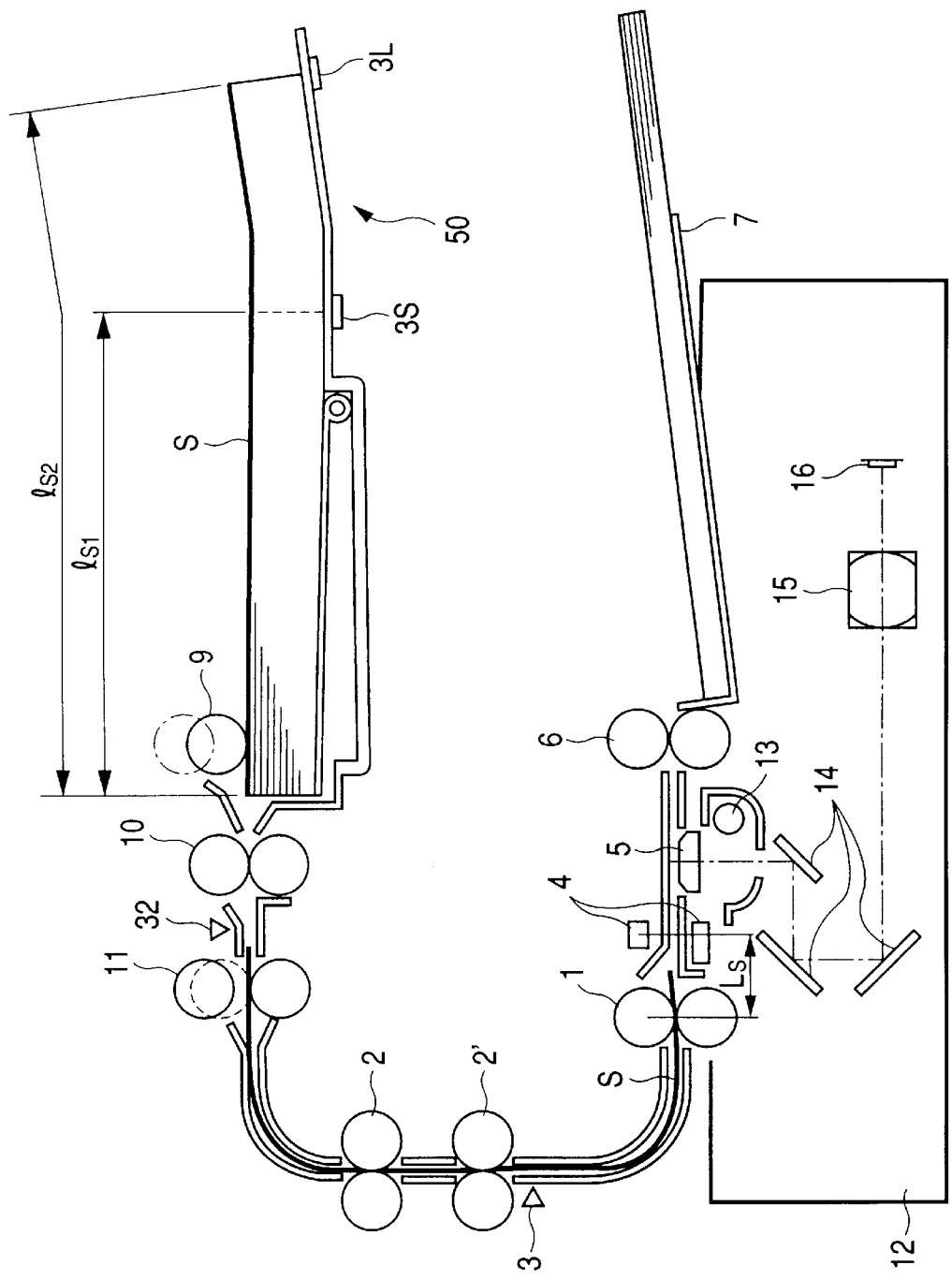
FIG. 10 is a sectional view of an image reading apparatus having a sheet conveying apparatus according to a sixth embodiment of the present invention.
Figure 11:
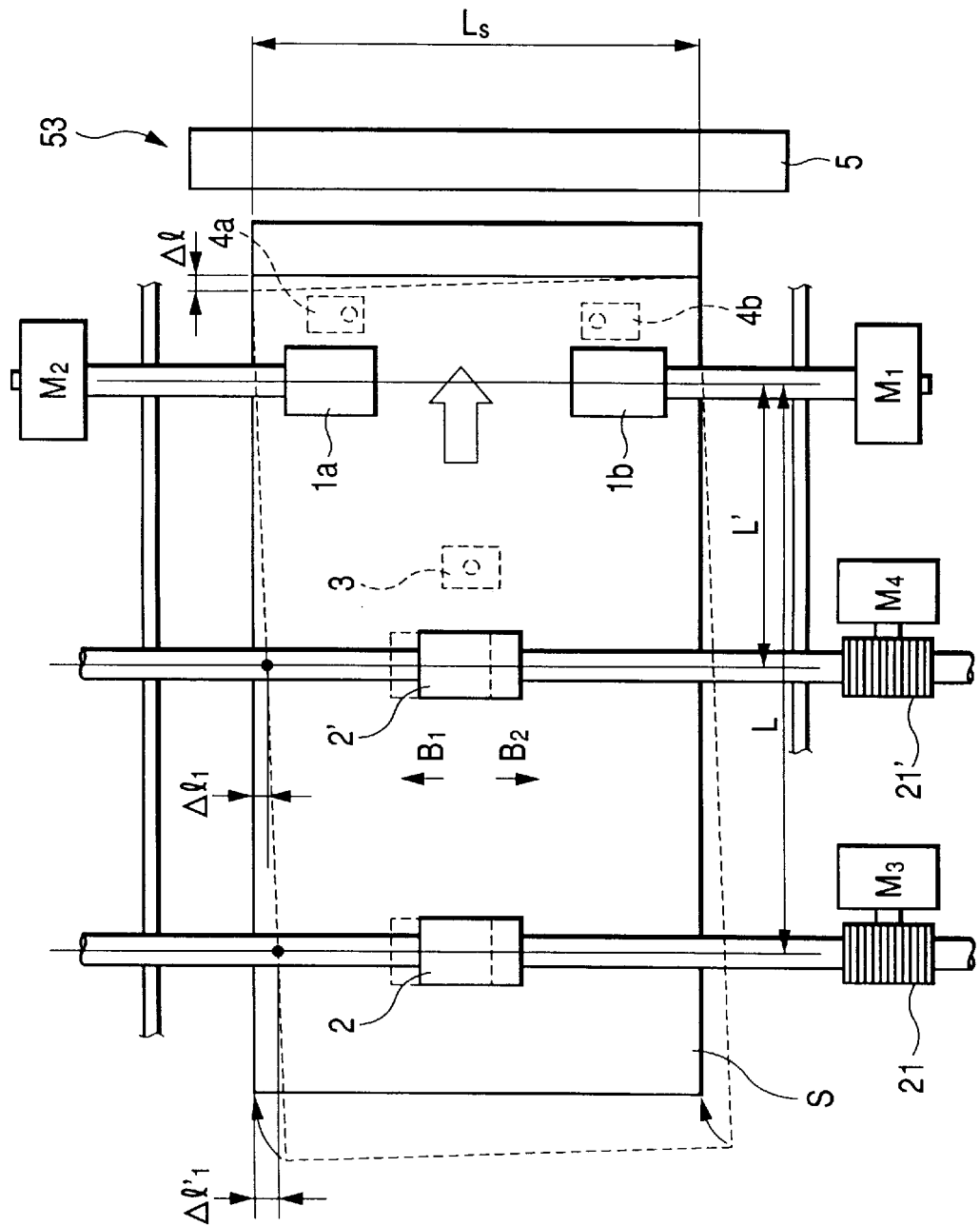
FIG. 11 is a plan view of a skew correction portion of the sheet conveying apparatus of FIG. 10.

In FIGS. 10 and 11, there is provided a third pair of convey rollers 2', and a thrust position of the third convey roller pair 2' can be controlled by a fourth drive motor $M_4$. Incidentally, since the construction and operation (including detection of home position by using the microswitch) of the third convey roller pair 2' are the same as those of the second original convey roller pair 2, explanation thereof will be omitted.

Figure 12:
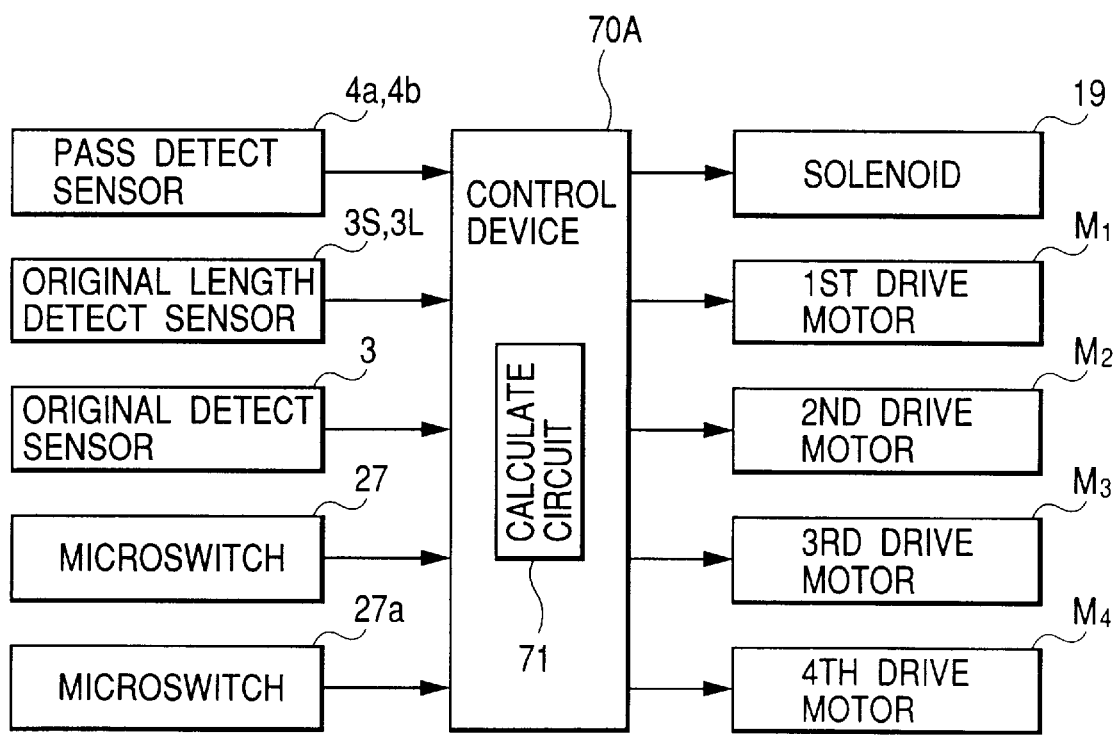
FIG. 12 is a block diagram of a control device of the image reading apparatus of FIG. 10.

In the image reading apparatus including such third convey roller pair 2', the original S entered into and pinched by the nip of the regist roller pair 1 is conveyed to the image reading portion 53 as it is; meanwhile, the original passes through the pass detect sensors 4a, 4b. On the basis of the detection signals from the pass detect sensors 4a, 4b, a control device 70A shown in FIG. 12 calculates the inclination of the original S and controls the rotational speeds of the pair of regist rollers 1a, 1b and the first and second drive motors $M_1$, $M_2$ on the basis of the calculated result.

At the same time, the shift control amounts of the second and third convey roller pairs 2, 2' are calculated by the calculate circuit 71 on the basis of the inclination of the tip end of the original S, and, by rotating the third and fourth drive motors $M_3$, $M_4$ by required amounts, the thrust positions of the second and third convey roller pairs 2, 2' are shifted.

Regarding the shift control amounts of the second and third convey roller pairs 2, 2', in case of FIG. 11, the second convey roller pair 2 is shifted in the direction $B_1$ by an amount of $\Delta l_1{'}$ and the third convey roller pair 2' is shifted in the direction $B_1$ by an amount of $\Delta l_1$. Incidentally, the shift amount $\Delta l_1{'}$ of the second convey roller pair 2 and the shift amount $\Delta l_1$ of the third convey roller pair 2' are represented by the following equations, when it is assumed that the inclination of the tip end of the original S is $\Delta l$, a distance from the regist roller pair 1 to the second convey roller pair 2 is L, a distance from the regist roller pair 1 to the third convey roller pair 2' is L' and a width of the original S is $L_S$:

$$\Delta l_1 = L'/L_S \times \Delta l, \text{ and}$$

$$\Delta l_1{'} = L/L_S \times \Delta l.$$

Thereafter, the trail end of the original S is detected by the original detect sensor 3. When the control device 70A judges that the trail end of the original S has passed through the second convey roller pair 2 on the basis of the detection signal from the original detect sensor 3, the third and fourth drive motors $M_3$, $M_4$ are rotated reversely. Further, when the fact that the microswitch 27 of the second convey roller pair 2 and a microswitch 27a of the original detect sensor 3 reach their home positions is detected, the third and fourth drive motors are stopped, to thereby prepare for the next original skew correction.

Since the further operations are the same as those of the first embodiment, explanation thereof will be omitted.

Next, an image reading apparatus having a sheet conveying apparatus according to a seventh embodiment of the present invention will be explained with reference to FIG. 13.

Figure 13:
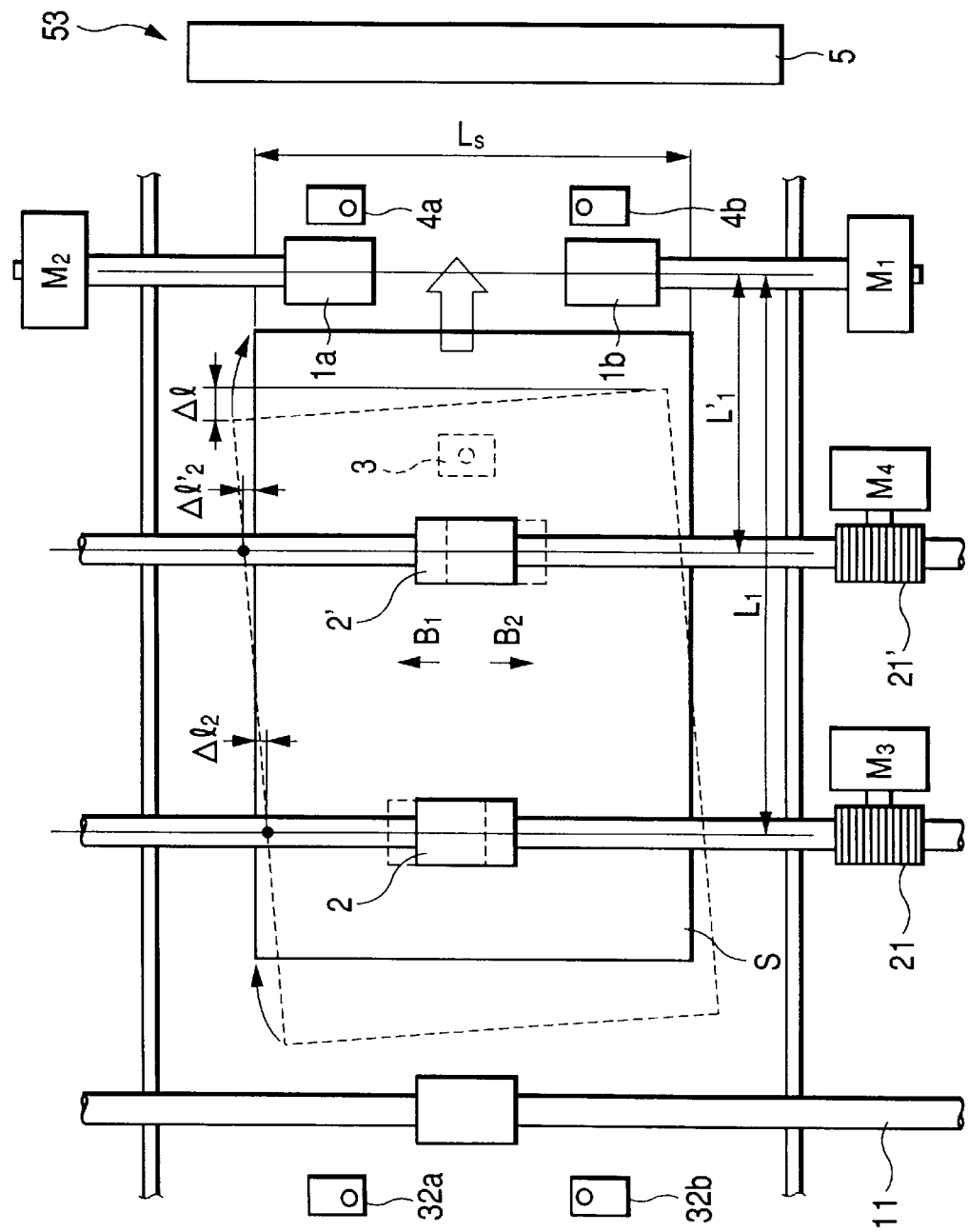
FIG. 13 is a plan view of a skew correction portion of an image reading apparatus having a sheet conveying apparatus according to a seventh embodiment of the present invention.

In FIG. 13, inclination detect sensors 32a, 32b of light permeable type (sheet skew amount detection means) for detecting the inclination of the tip end of the original after the sheet supply are spaced apart from each other with a predetermined distance therebetween along the direction substantially perpendicular to the conveying direction and are disposed in the vicinity of and at a downstream side of the separation/supply roller 10.

Figure 14:
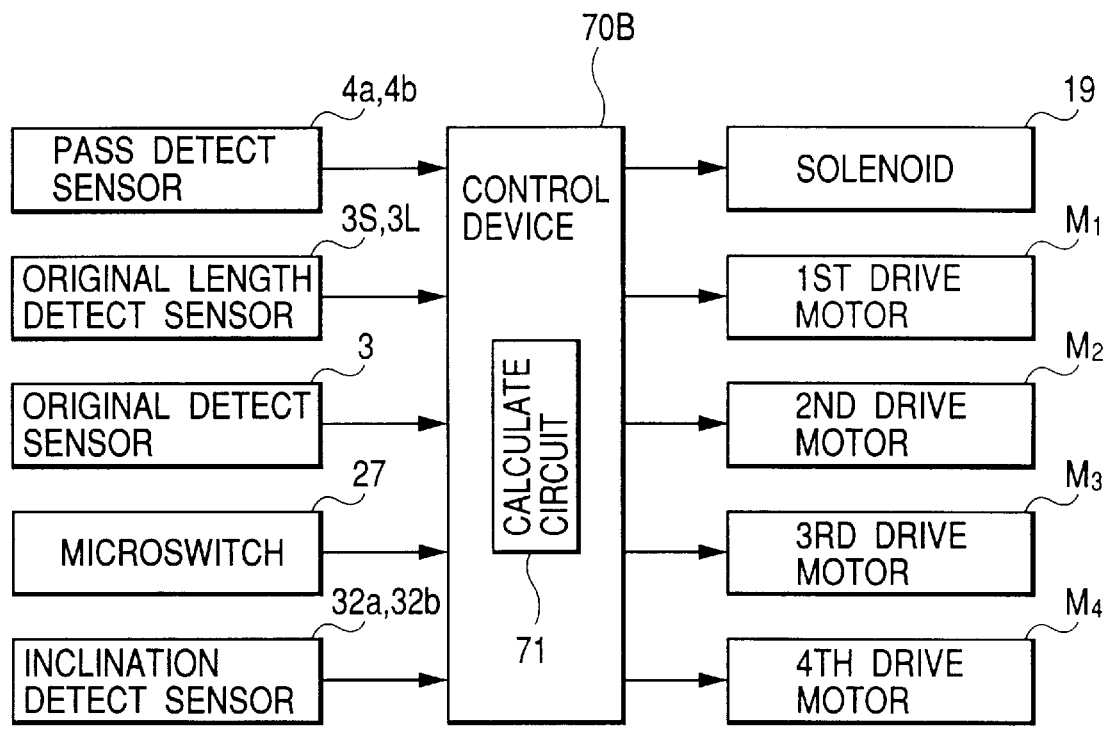
FIG. 14 is a block diagram of a control device of the image reading apparatus of FIG. 13.

When the original S conveyed by the separation/supply roller 10 is detected by the inclination detect sensors 32a, 32b, detection signals from the sensors are sent to a control device 70B shown in FIG. 14, and inclination of the original is calculated by the calculate circuit 71 on the basis of the detection signals. When the original S is further conveyed and the tip end of the original S reaches the original detect sensor 3 (i.e., when the original is pinched by both second convey roller pair 2 and third convey roller pair 2'), the skew-feed of the original is corrected by controlling the third and fourth drive motors $M_3$, $M_4$ on the basis of the calculated result.

In case of FIG. 13, the second convey roller pair 2 may be shifted in the direction $B_1$ by an amount of $\Delta l_2$ and the third convey roller pair 2' may be shifted in the direction $B_2$ by an amount of $\Delta l_2{'}$. Incidentally, the rotational speeds of the motors $M_3$, $M_4$ are selected so that the control is finished before the trail end of the original leaves the third convey roller pair 2'.

The shift control amounts $\Delta l_2$, $\Delta l_2{'}$ of the roller pairs 2, 2' are represented by the following equation, when it is assumed that a distance between the second convey roller pair 2 and the third convey roller pair 2' is $(L_{-1}{'} - L_{-1})$, skew amount of the original is $\Delta l$ and a width of the original is $L_S$:

$$\Delta l_2 = \Delta l_2{'} = \tfrac{1}{2} \times (L_1{'} - L_1)/L_S \times \Delta l$$

The original S skew-corrected in this way reaches the regist roller pair 1.

Since a further operations are the same as those of the sixth embodiment, explanation thereof will be omitted.

In this embodiment, while an example that two pairs of shiftable convey rollers are provided was explained, the present invention is not limited to such an example. Further, a plurality of engageable/disengageable convey rollers may be used. Of course, the lateral regist correction function may be incorporated into the seventh embodiment. In addition, as described in connection with the first embodiment, the shift amounts of the second and third convey roller pairs 2, 2' may be changed in accordance with the sheet thickness information and/or sheet length information.

In the above explanations, while the present invention was applied to the original image reading apparatus, the present invention may be applied to an image forming apparatus such as a copying machine and a printer, as well.

Next, an eighth embodiment of the present invention will be explained with reference to the accompanying drawings.

Incidentally, in embodiments described hereinbelow, a "sheet convey means" corresponds to a second convey roller pair 2, a "skew amount detection means" corresponds to pass detect sensors 4a, 4b and inclination detect sensors 32a, 32b, a "roller pair" corresponds to a regist roller pair 1a, 1b, "drive sources" corresponds to a first drive motor $M_1$ and a second drive motor $M_2$, and a "skew correction means" corresponds to a control device 70. A "shift means" corresponds to a third drive motor $M_3$, and a "control means" corresponds to the control device 70. An "upstream side sheet convey means" corresponds to a first convey roller pair 1, a "sheet size detection means" corresponds to original length detect sensors 3S, 3L and an "engagement/disengagement means" corresponds to the control device 70. A "control amount" (i.e., "difference in drive speed of drive sources", "difference in rotation angular speed of the drive sources", "imaginary shift amount" and "imaginary positional information") is determined by $M_1$Clk, $M_2$Clk or on the basis of $M_1$Clk, $M_2$Clk. A "sheet end detection means" corresponds to a lateral regist sensor 31 and a "sheet thickness detection sensor" corresponds to a thick detect sensor 33.

[Eighth Embodiment]

Figure 15:
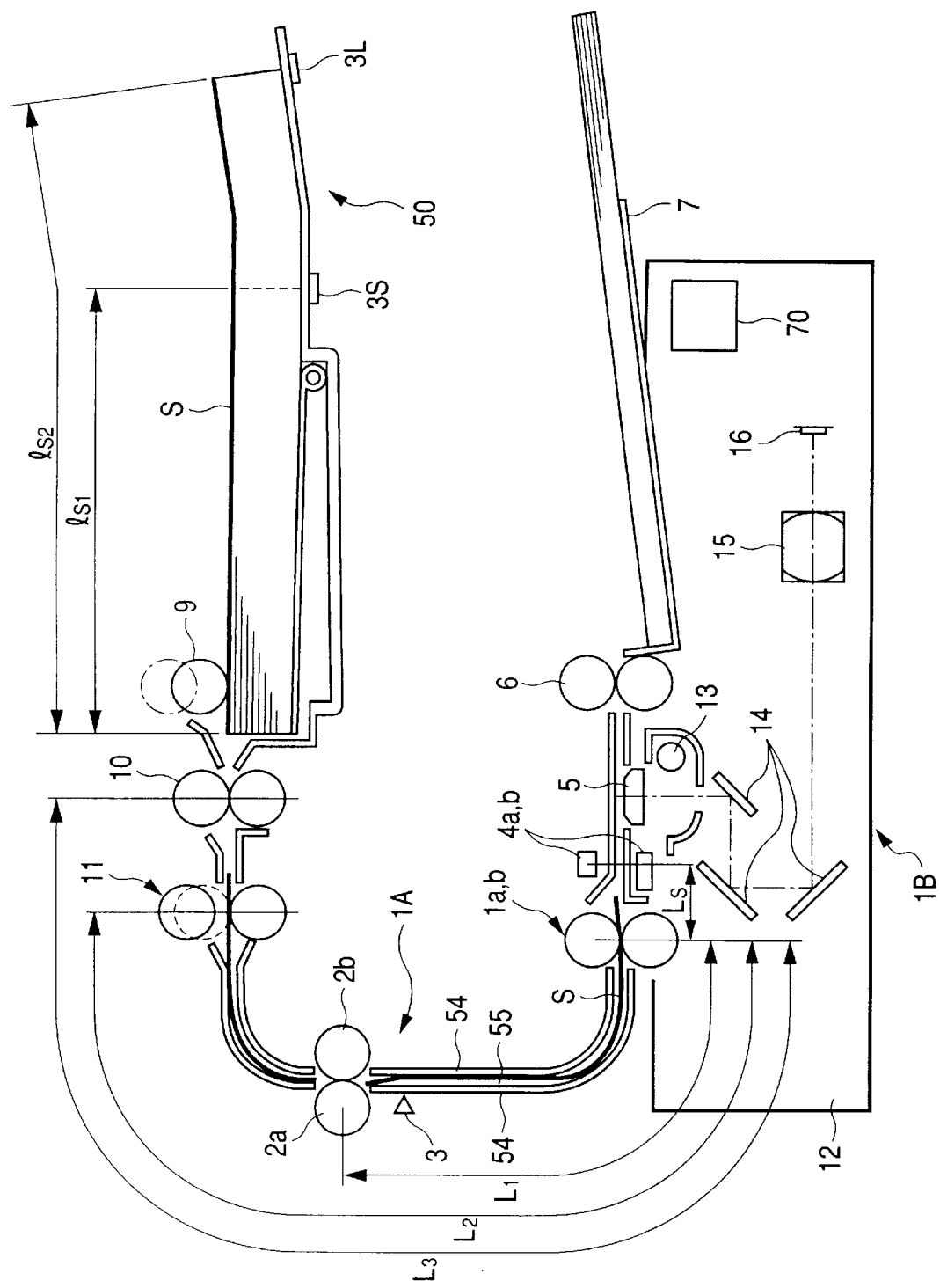
FIG. 15 is a schematic view briefly showing an image reading apparatus according to an eighth embodiment of the present invention.

An eighth embodiment of the present invention is embodied as an image reading apparatus having a sheet conveying apparatus, which includes a sheet conveying apparatus 1A and an image reading portion 1B, as shown in FIG. 15. Since a main characteristic of this embodiment resides in the sheet conveying apparatus 1A, the sheet conveying apparatus 1A will be described mainly.

As shown in FIG. 15, the sheet conveying apparatus 1A includes a sheet supply portion 50, original length detect sensors 3S, 3L, a pick-up roller 9, a separation/supply roller pair 10, a first convey roller pair 11, a second convey roller 2, an original detect sensor 3, a regist roller pair 1a, 1b, pass detect sensors 4a, 4b and a control device 70.

Figure 16:
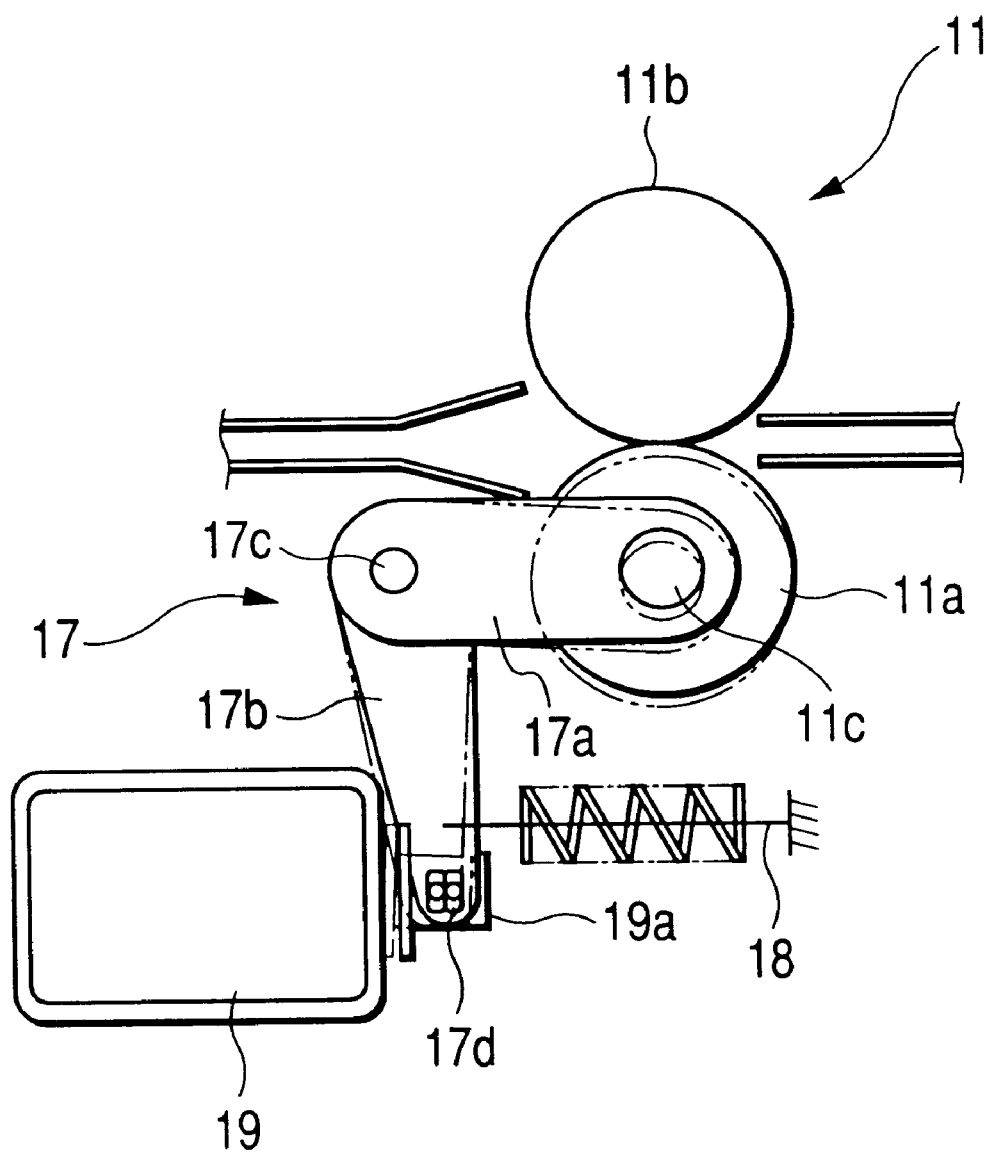
FIG. 16 is a view showing an engagement/disengagement mechanism for a first pair of convey rollers.
Figure 17:
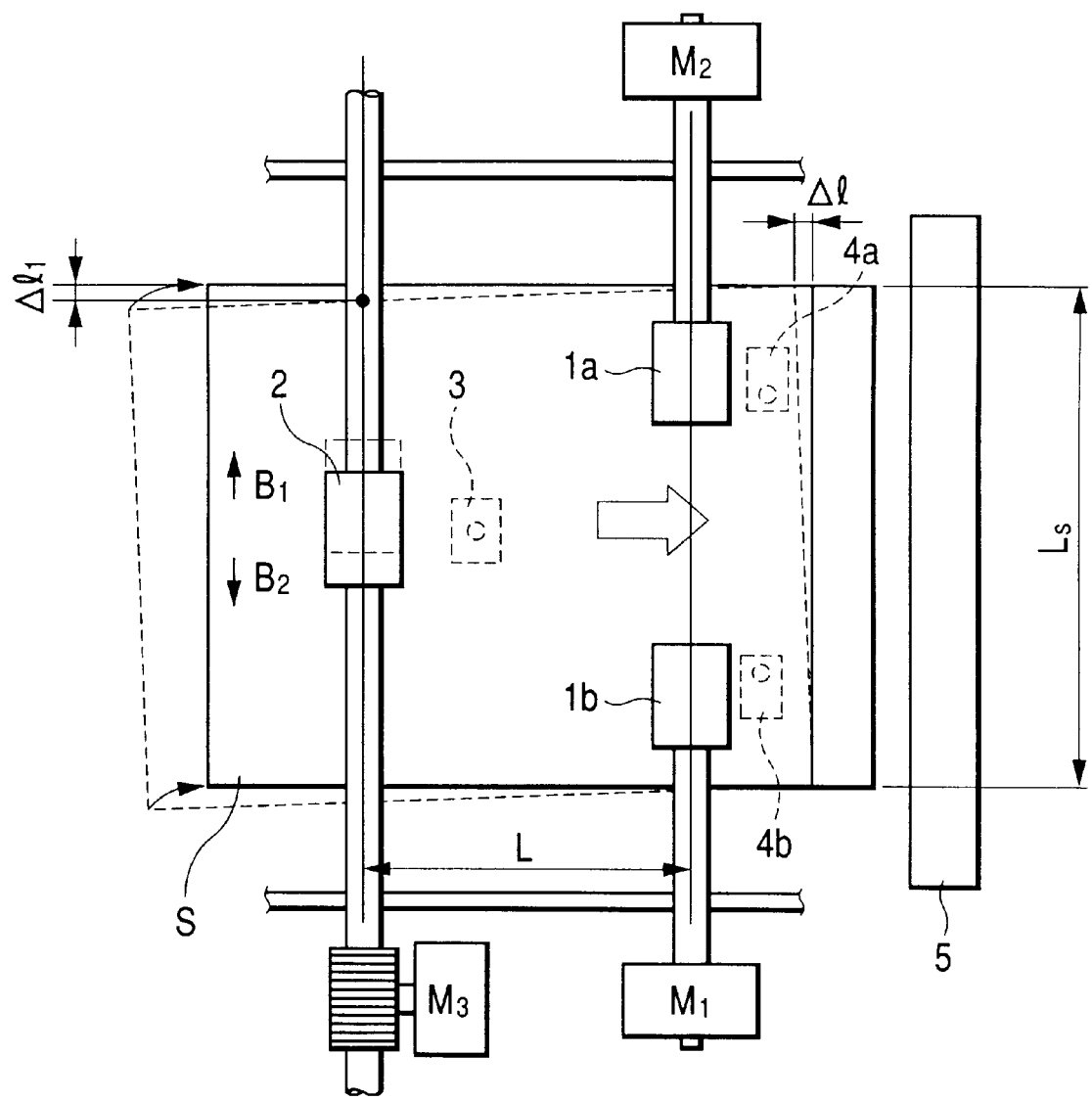
FIG. 17 is a plan view of a skew correction portion.
Figure 18:
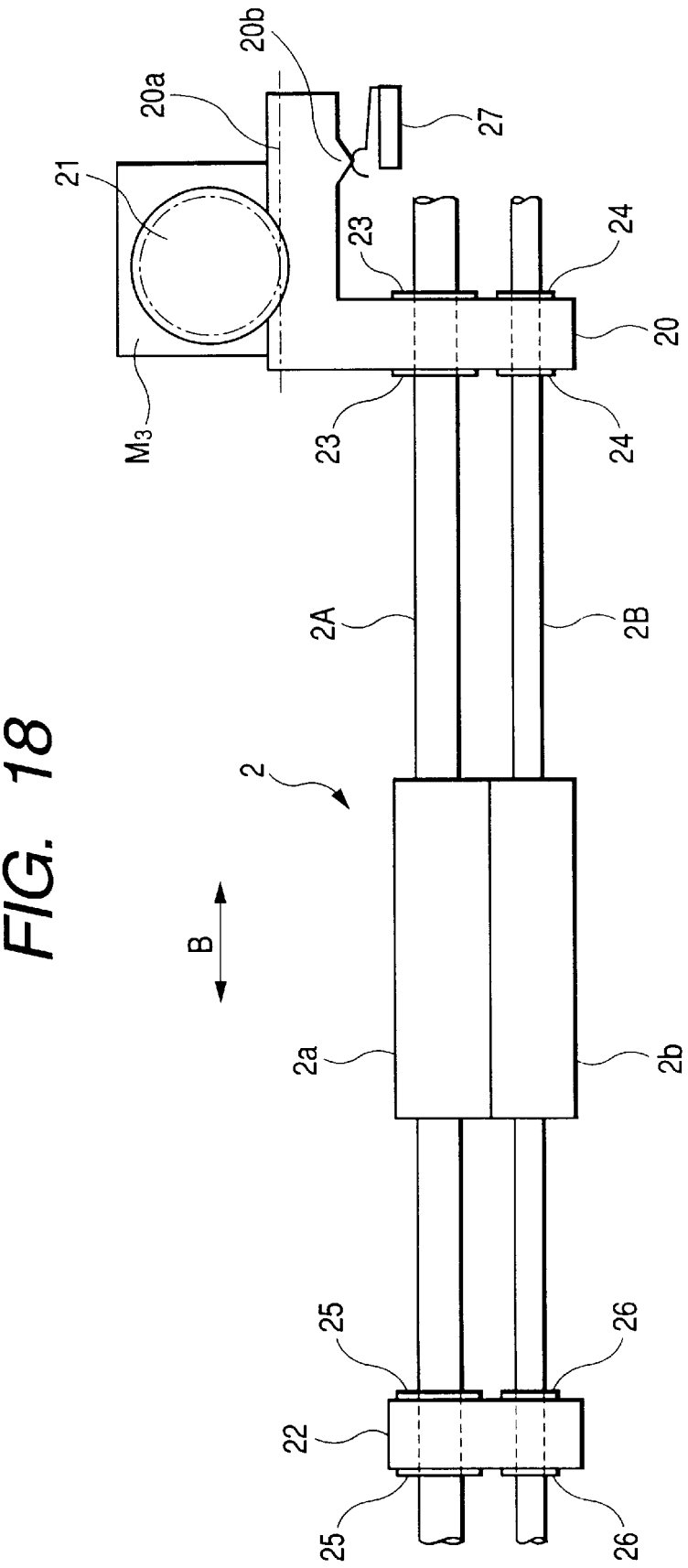
FIG. 18 is a plan view showing a shift mechanism for a second pair of convey rollers.
Figure 19:
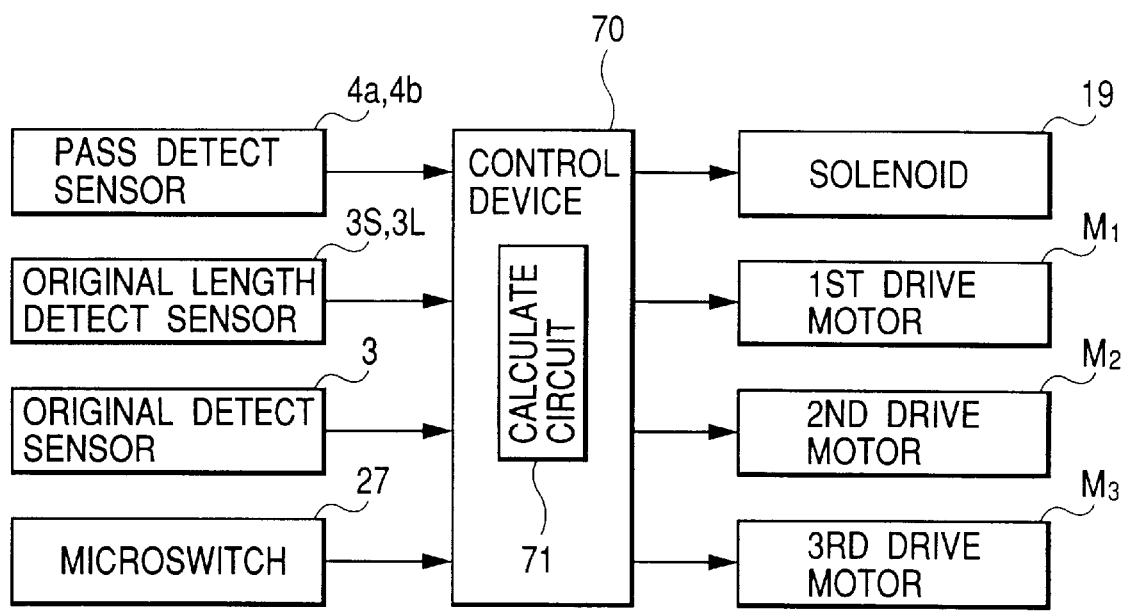
FIG. 19 is a block diagram showing a control portion.

FIG. 16 shows an engagement/disengagement mechanism for the first convey roller pair 11. FIGS. 17 and 18 show a shift means for shifting the second convey roller pair 2 in a rotational direction. FIG. 19 is a control block diagram of this embodiment. These elements are the same as those in the first embodiment.

Since a skew correcting operation and a control means for controlling such a skew correcting operation are characteristics of this embodiment, such an operation and control means will be described hereinbelow.

First of all, when the originals S are set on the sheet supply portion 50, the size of the original (original length) is detected by the original length detect sensors 3S, 3L, and the detection signals are inputted to the control device 70. If the original S has small length, the control device 70 turns a solenoid 19 OFF to achieve the engagement condition of the first original convey roller pair 11; whereas, if the original S has great length, the control device 70 turns the solenoid 19 ON to achieve the disengagement condition of the first original convey roller pair 11.

Then, when a start button (not shown) is depressed, the pick-up roller 9 is rotated by a drive mechanism (not shown) to fed out an uppermost original on the original stack S toward the pair of separation/supply rollers 10. When the single original is fed out, the pair of separation/supply rollers 10 feeds the original toward a downstream side as it is; whereas, if two or more originals are fed out, the lower roller (in the separation/supply roller pair 10) is rotated in a direction opposite to the feeding direction to separate the originals, to thereby convey only the uppermost original S toward the downstream side. Since the separation mechanism does not directly relate to the present invention, detailed explanation thereof will be omitted.

Thereafter, the original S is conveyed to the regist roller pair 1 through an original convey path 55 by the first and second pairs of convey rollers 2, 11 (or only by the second pair of convey rollers 2 when the original has great length $lS_2$). The pair of regist rollers 1 are rotated at the same speeds as the original conveying speeds of the first and second pairs of convey rollers 2, 11 so that the original S pinched between the pair of regist rollers 1 is conveyed toward the image reading portion 1B as it is; meanwhile, the original S is detected by the pass detect sensors 4a, 4b, and detection signals from the sensors are inputted to the control device 70.

In the control device 70, first of all, inclination of the tip end of the original S is calculated by a calculate circuit 71 on the basis of the detection signals. Then, the rotational speeds of first drive motor $M_1$ for driving the regist roller 1a and of the second drive motor $M_2$ for driving the regist roller 1b are controlled on the basis of the calculated inclination, to thereby effect the skew correction. For example, in case of FIG. 17, the regist roller 1b relating to the advanced side of the original is delayed (i.e., the rotational speed of the first drive motor $M_1$ is delayed) to correct the skew-feed. Now, the skew correction will be fully described.

The pulse rate of the skew correction is calculated on the basis of the skew amount, feed amount per one pulse, conveying speed and correction time. For example, in two-phase excitation drive of a two-phase hybrid stepping motor, since the motor is rotated by one revolution by 200 pulses, the motor is rotated by 1.8 degrees per one pulse. When a roller having a diameter of 20 mm is attached to a shaft of this motor to convey the original, a feed amount of 62.8 mm (=20 mm×n) is obtained when the motor shaft is rotated by one revolution. Regarding one pulse, a feed amount of 0.314 mm (=20 mm×n/200 pulse/rot) is obtained. If it is assumed that the skew amount is 6.28 mm, this skew amount corresponds to 20 pulses. If it is assumed that the original conveying speed is 314 mm/sec, the rotational speed of the motor including the roller having the diameter of 20 mm becomes 5 rps (=314/20n), which corresponds to 1000 pps (regarding the pulse rate).

Incidentally, the rotational angle per one pulse is varied with the kind of stepping motor and exciting method. Explaining a typical example, in the two-phase excitation drive of the two-phase hybrid stepping motor, the rotational angle per one pulse is 1.8 deg/pulse, and, in 1–2 phase excitation drive of the two-phase hybrid stepping motor, the rotational angle per one pulse is 0.9 deg/pulse, and, in four-phase excitation drive of a five-phase hybrid stepping motor, the rotational angle per one pulse is 0.72 deg/pulse, and, in 4–5 phase excitation drive of five-phase hybrid stepping motor, the rotational angle per one pulse is 0.36 deg/pulse.

Motor clock frequency f during normal conveyance and motor clock frequency fr during skew correction are represented as follows:

$$f = V/(\pi l) \times S \quad [\text{pps}]$$

$$fr = f - (n/t) \quad [\text{pps}]$$

where f is motor clock frequency during normal conveyance, fr is motor clock frequency fr during skew correction, n is a pulse conversion value of skew amount $(=d/(\pi l)/S)$, d is a skew amount (mm), l is a roller diameter (mm), S is the number of pulses per one revolution, V is the conveying speed (mm/sec) and t is a correction time.

Incidentally, the correction time t is a time duration from start of correction and finish of correction and is physically determined by the convey path. For example, when it is assumed that the conveying speed is 314 mm/sec and the correction is desired to be finished within a distance of 31.4 mm, the correction time becomes 0.1 second.

As a concrete example, it is considered that the skew amount of 6.28 mm is corrected within 0.1 second when the motor is driven with 1000 pps (it is assumed that a back side of the original is delayed). In this case, a back side motor continues to rotate with 1000 pps. On the other hand, a this Wide motor is driven by 0.1 second with 800 pps (temporarily deduced from 1000 pps), and, thereafter, 1000 pps is returned. By effecting such control, a this side of the original is delayed by an amount of 6.28 mm. While the this side motor is being driven with 800 pps, the original is advanced by 31.4 mm.

Such coefficient has a value previously determined by tests and is stored in a memory (as a table).

On the basis of the above-mentioned principle, by controlling the number of revolutions of the first and second drive motors $M_1$, $M_2$ by means of the control device 70, the skew-feed can be corrected. However, if the skew amount is great, since the great speed reduction of the motors is required, it is considered that the motors themselves cannot follow the speed reduction. Thus, in actual, the back side feed amount and this side feed amount of the original are changed by gradually changing the number of revolutions of the motors. Now, control for effecting the gradual speed reduction will be explained with reference to FIGS. 20A and 20B.

Figure 20A:
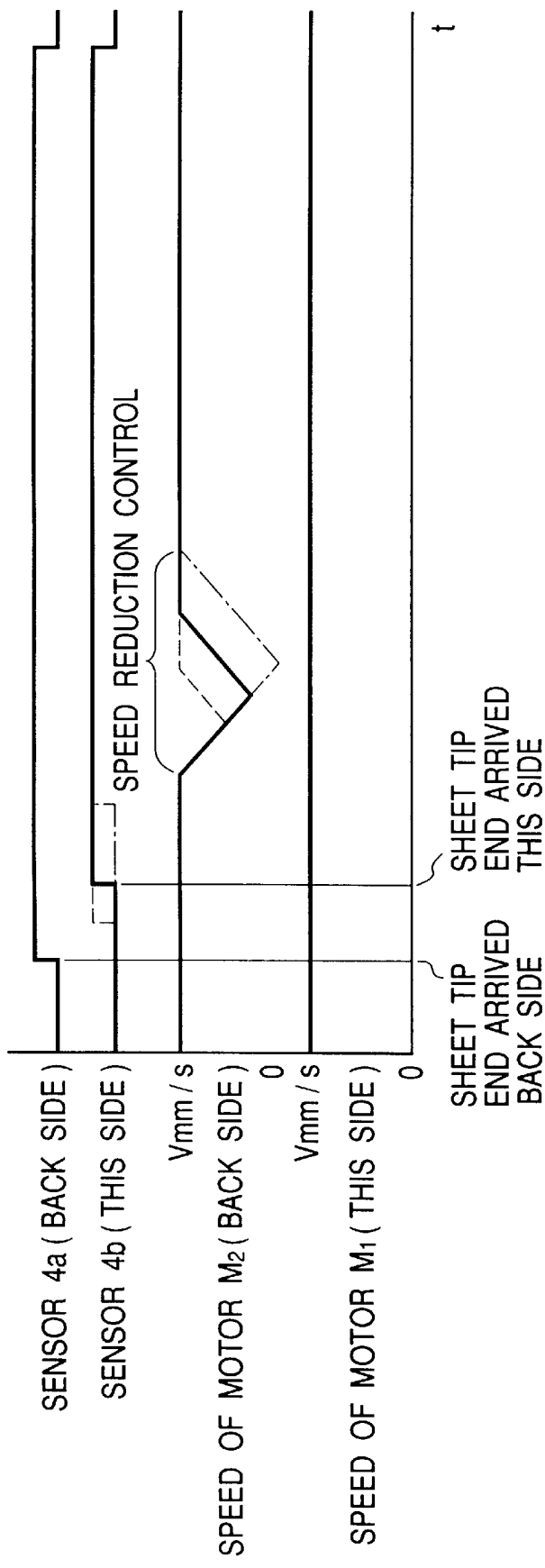
FIGS. 20A and 20B are timing charts for skew correction.
Figure 20B:
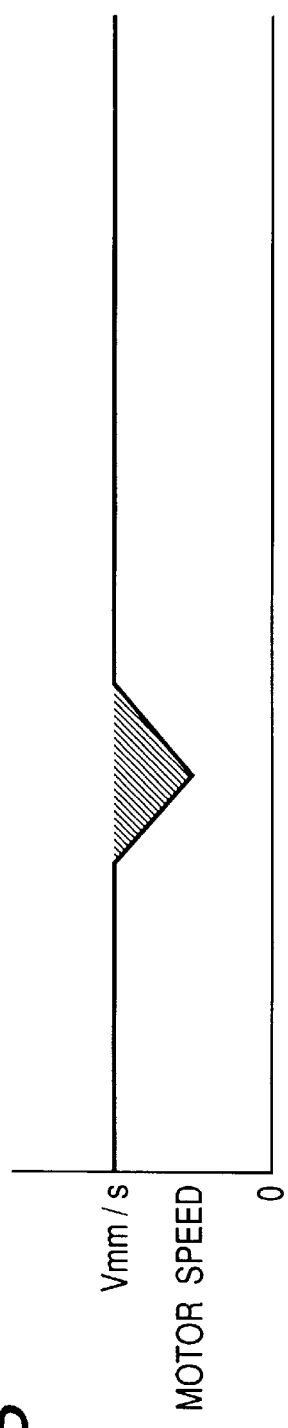

FIGS. 20A and 20B are timing charts showing the speed reduction of the motors. Difference in time (time difference) when the original reaches the pass detect sensors 4a and 4b has a value reflecting the skew amount. Accordingly, speed reduction curves for the motors are determined in accordance with the time difference. As shown in FIG. 20A, the speed reduction amount of the motors are changed in accordance with three different skew amounts represented by three lines (broken line: small skew mount, solid line: average skew amount, dot and chain line: great skew amount). An area of speed reduction (area shown by the hatched region in FIG. 20B) corresponds to a delayed amount ($\Delta l_1$) delayed with respect to the feed amount during the normal conveyance at the normal speed. This delayed amount is represented by product of motor speed difference and time.

In case of a stepping motor, the rotational speed of the motor corresponds to difference in frequency of applied clocks. In case of a DC motor, the rotational speed of the motor can be detected by a magnetic encoder or an optical encoder (both are not shown).

In parallel with the skew correction effected by controlling the regist rollers 1a, 1b, the control device 70 controls the thrust position of the second convey roller pair 2. Now, the control of the thrust position of the second convey roller pair 2 will be described.

In the control device 70, the shift control amount of the second convey roller pair 2 is calculated by the calculate circuit 71 on the basis of the inclination of the tip end of the original S, and the thrust position of the second convey roller pair 2 is shifted by rotating the third drive motor $M_3$ on the basis of the calculated shift control amount.

For example, a condition shown in FIG. 17 is considered. The second convey roller pair 2 is shifted by an amount of $\Delta l_1$ in a direction (shown by the arrow $B_1$) substantially perpendicular to the sheet conveying direction. As a result, the original S being skew-corrected by the regist roller pair 1 is shifted to the direction substantially perpendicular to the sheet conveying direction, to thereby correct the skew-feed with high accuracy. Incidentally, if the original S has small length, during the shifting movement of the original, since the trail end of the original S has already been passed through the nip of the first original convey roller pair 11, the movement of the original S during the skew correction is not obstructed. Even if the original S being conveyed has great length, since the first original convey roller pair 11 is previously set to the disengagement condition, the movement of the original S during the skew correction is not obstructed similarly.

The shift amount $\Delta l_1$ of the second original convey roller pair 2 is approximately represented by the following equation:

$$\Delta l_1 = L/L_S \times \Delta l$$

where, $\Delta l_1$ is the shift amount of the second original convey roller pair 2, L is a distance between the regist roller pair 1a, 1b and the second original convey roller pair 2, $L_S$ is a width of the original S and $\Delta l$ is the inclination of the tip end of the original S.

By shifting the second original convey roller pair 2 in the thrust direction in this way, the skew correction is effected. Thereafter, the original S reaches the reading glass 5, where the image on the original is read.

Thereafter, when the trail end of the original S is detected by the original detect sensor 3, the control device 70 detect the fact that the trail end of the original is passed through the second original convey roller pair 2 on the basis of the detection signal from the original detect sensor 3. As a result, the third drive motor $M_3$ is rotated reversely by the control device 70. Due to the reverse rotation of the third motor $M_3$, the second original convey roller pair 2 is shifted to a direction shown by the arrow $B_2$ in FIG. 17. When the second original convey roller pair 2 is returned to the home position, the control device 70 stops the driving of the third drive motor $M_3$ for preparation for next skew correction of original. Incidentally, on the basis of an output signal from a microswitch 27 (FIG. 18), it is judged whether or not the second original convey roller pair 2 is returned to the home position. When the second original convey roller pair 2 is returned to the home position, the microswitch 27 is turned ON by a projection 20b provided on a bearing 20.

When the skew correction is effected by the regist rollers 1a, 1b in this way, by controlling the thrust position of the second original convey roller pair 2, the movement of the entire original in the rotational direction (skew correction direction) is promoted, and, by not obstructing the movement of the original, the skew correction can be achieved with high accuracy.

In the illustrated embodiment, while an example that one pair of engageable/disengageable original convey rollers are used was explained, a plurality of pairs of such convey rollers may be used. Further, the rotational speed of the third drive motor $M_3$ and the start/stop timing of the rotation of the third drive motor $M_3$ are most preferably depended upon the rotational direction movement of the original S given by the first and second drive motors $M_1$, $M_2$ during the skew correction, but may be selected to be finished at least during the skew correction effected by the first and second drive motors $M_1$, $M_2$.

[Ninth Embodiment]

Next, a ninth embodiment of the present invention will be explained with reference to FIGS. 21A and 21B.

If the rotational direction movement of the original S during the skew correction does not coincide with the speed and timing of the thrust direction movement of the second original convey roller pair 2 given by the third motor $M_3$, flexion is generated in the original during the skew correction due to torsion of the original, so that the sliding resistance between the original and the convey guides 54 is increased, to thereby worsen the accuracy of skew correction. In the ninth embodiment, the accuracy of the skew correction is improved by controlling the driving of the motor. Since the other arrangements are substantially the same as those in the eighth embodiment, the difference from the eighth embodiment will be mainly described.

In the ninth embodiment, the control contents of the control device 70 differs from that in the eighth embodiment. Now, timing charts shown in FIGS. 21A and 21B will be explained.

In this case, a case where the original firstly reaches the pass detect sensor 4a is considered. As shown in FIG. 21A, where the original firstly reaches the pass detect sensor 4a, the skew correction is effected by reducing the speed of the second drive motor $M_2$ associated with the pass detect sensor 4a. Meanwhile, the first drive motor $M_1$ continues to convey the original at a speed of V mm/sec. In a time period $t_2$ during which the speed of the second drive motor $M_2$ is being reduced, the third drive motor $M_3$ is rotated to shift the second convey roller pair 2 in the thrust direction. In this case, the speed of the third drive motor $M_3$ corresponds to the speed reduction of the first drive motor $M_1$.

As described in connection with FIG. 20B, the shift amount (positional change) of the original during the skew correction is represented by the integrated value of the speed reduction period. In the skew correction control according to this embodiment, since the speed of the first drive motor $M_1$ (or second drive motor $M_2$) is increased or decreased at uniform acceleration, the integrated value is changed not linearly but in a square manner. Accordingly, if the third drive motor $M_3$ is rotated at a uniform speed, the speed of the motor does not coincide with the movement of the original during the skew correction. In the illustrated embodiment, the acceleration of the third drive motor $M_3$ depends upon inclination of acceleration (acceleration inclination) of the speed reduction of the second drive motor $M_2$ so that the thrust shifting movement of the second convey roller pair 2 can follow the movement of the original during the skew correction completely. Incidentally, in FIG. 21A, inclination of a line indicating the speed of each motor corresponds to the acceleration.

When the first, second and third drive motors $M_1$, $M_2$ and $M_3$ are stepping motors, the control shown in FIG. 21A is actually effected as shown in FIG. 21B. That is to say, $M_1$Clk is maintained as constant frequency, and, regarding $M_2$Clk, frequency is reduced linearly. And, when the frequency reaches a predetermined value, the frequency is increased linearly again to the original or initial frequency.

Meanwhile, frequency of $M_3$Clk for controlling the third drive motor $M_3$ is increased linearly and then reduced linearly from the change point of $M_2$Clk and is stopped. Inclination of change (acceleration) of $M_3$Clk in this case depends upon inclination of change (acceleration) of $M_2$Clk.

When the first and second drive motor $M_1$, $M_2$, are DC motors, clocks corresponding to $M_1$Clk, $M_2$Clk are obtained by using encoders to achieve the similar control.

In the ninth embodiment, the drive motors $M_1$, $M_2$ and $M_3$ were controlled by the control device 70. However, the drive motors can be controlled in a hardware manner. An example of a circuit used in such hardware control is shown in FIG. 22.

Figure 22:
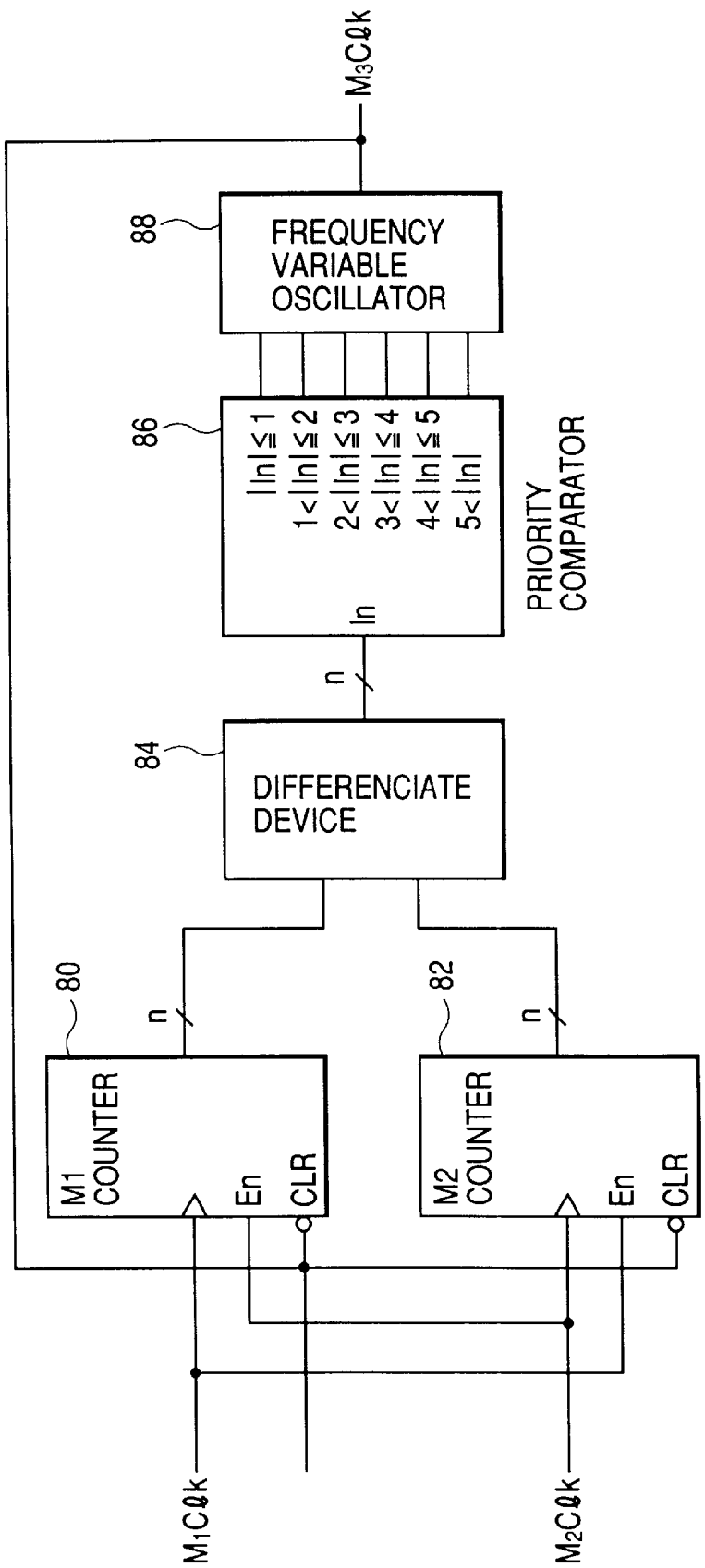
FIG. 22 is a block diagram showing an example of a circuit for controlling a third drive motor.

In the example shown in FIG. 22, the third drive motor $M_3$ is controlled by a circuit including an MI counter 80, an M2 counter 82, a differentiate device 84, a priority comparator 86 and a frequency variable oscillator 88. $M_1$Clk is inputted to the M1 counter 80 and $M_2$Clk is inputted to the M2 counter 82.

$M_2$Clk is inputted to enable of the M1 counter 80 and $M_1$Clk is inputted to enable of the M2 counter 82 so that clocks of the partner can be counted by Clk of itself. The M1 counter 80 and the M2 counter 82 can output their count values to the differentiate device 84. An output value from the frequency variable oscillator 88 (described later) is inputted to CLRs of the M1 counter 80 and the M2 counter 82.

The differentiate device 84 serves to output difference between the input value from the M1 counter 80 and the input value from the M2 counter 82. If $M_1$Clk and $M_2$Clk have the same frequency, an absolute value of the output of the differentiate device 84 is "1" or "0". Since phases of $M_1$Clk and $M_2$Clk are not necessarily coincide with each other, the count value may becomes "1", but, since the frequency values are the same, the count value is returned to "0" again. Accordingly, if $M_1$Clk and $M_2$Clk have the same frequency, the differentiate device 84 outputs "1" and "0" repeatedly.

The differentiate device 84 is connected to the priority comparator 86 having an output value which varies with a range of the input value In from the differentiate device 84. The frequency variable oscillator 88 serves to generate $M_3$Clk for driving the third drive motor $M_3$. An output value of the priority comparator 86 is inputted to the frequency variable oscillator 88, and the oscillation frequency is varied with the input value (output value of the priority comparator 86).

In the illustrated embodiment, if the difference is smaller than 1, no output is generated from the frequency variable oscillator 88. The frequency variable oscillator 88 itself may be a V-F converter or carry output of a counter circuit.

Now, a controlling operation of the circuit will be explained with reference to FIG. 21B. When the original is conveyed in the normal condition, the first and second drive motors $M_1$, $M_2$ are controlled to have the same speed ($M_1$Clk=$M_2$Clk). Accordingly, in this case, the output of the differentiate device 84 is "0" or "1" and no output is generated from the frequency variable oscillator 88.

If the original passes through the pass detect sensors 4 in the skew condition, Clk frequency of the first or second drive motor $M_1$ or $M_2$ is changed in dependence upon the skew condition. As a result, the difference (output value of the differentiate device 84) between the count value of the M1 counter 80 and the count value of the M2 counter 82 becomes greater. And, when the output value of the differentiate device 84 becomes 2 or more, the frequency variable oscillator 88 outputs an oscillation signal ($M_3$Clk) having frequency corresponding to the difference. The grater the difference the greater the oscillation frequency. The driving of the third drive motor $M_3$ is controlled by $M_3Clk$ generated in this way.

[Tenth Embodiment]

Regarding a large size original and a thick original (having great rigidity), the sliding resistance between the original and the guides 54 is great. Thus, in dependence upon a pressurizing force and material of the second convey roller pair 2 and surface features of the guides 54, even when the second convey roller pair 2 is shifted in the thrust direction during the skew correction, the original S is slipped in the nip of the second convey roller pair 2, so that the thrust direction movement of the second convey roller pair 2 does not become coincidence with the movement of the original S, to thereby worsen the accuracy of the skew correction. In such a case, by considering the slip between the second convey roller pair 2 and the original S, the shift amount of the second convey roller pair 2 may be determined and controlled. In the control, in order to consider the slip between the second convey roller pair 2 and the original S, the size and thickness of the original may be used as control parameters. The size and thickness of the original are detected by the original size detect sensor and the original thickness detect sensor.

Incidentally, both the size and thickness of the original are not necessarily used as the parameters, either of the size or the thickness may be used as the parameter. The tenth embodiment is obtained by considering the above problem and is characterized in that a thickness detect sensor is provided to cope with a thick original. Now, the tenth embodiment will be fully described.

The fundamental arrangement of the tenth embodiment is the same as the above-mentioned embodiments, except that the original thickness detect sensor is provided and a detection result (thickness of the original) from the original thickness detect sensor is used as a control parameter. Thus, the characteristic parts of the tenth embodiment will be mainly explained.

Figure 23:
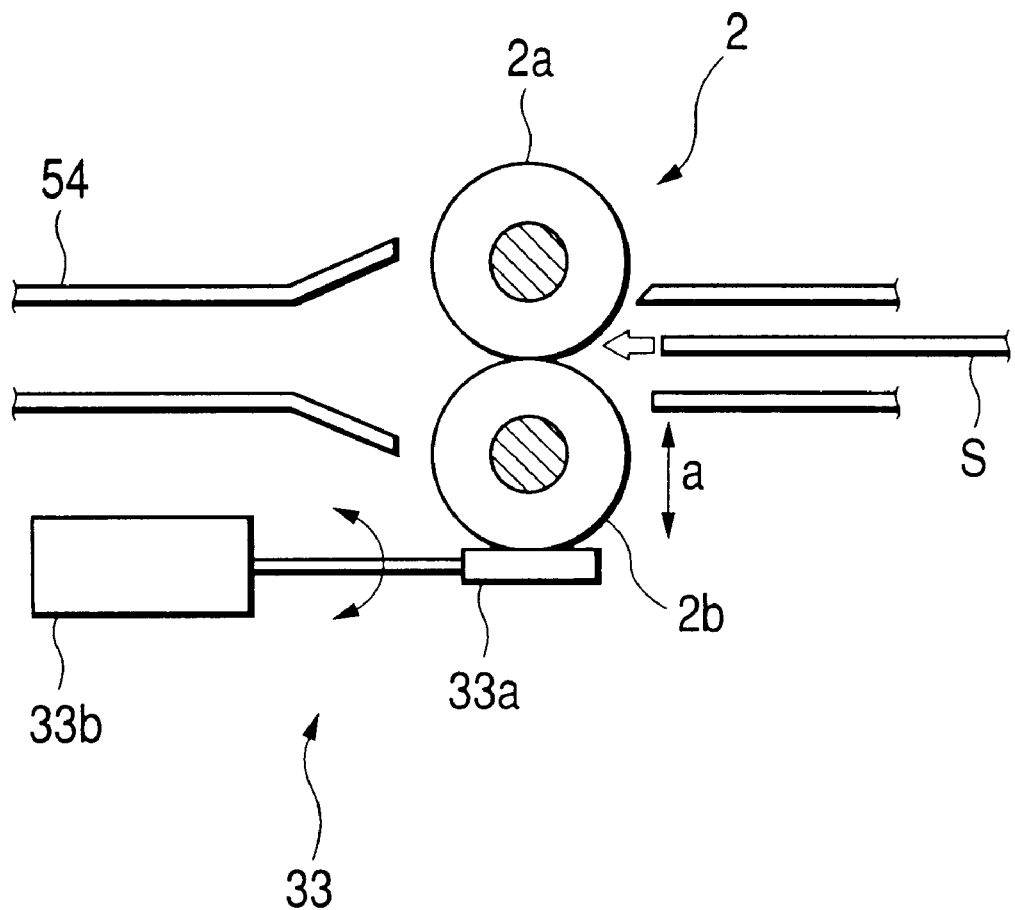
FIG. 23 is an explanatory view showing an original thickness detection portion of an image reading apparatus according to a tenth embodiment of the present invention.

As shown in FIG. 23, the thickness detect sensor 33 includes a movable element 33a which follows the movement of the driven roller 2b of the second convey roller pair 2 to be shifted in directions shown by the arrow a, and a potentiometer 33b of non-contact type for detecting a position of the movable element 33a. The thickness detect sensor 33 is positioned in the vicinity of the second convey roller pair 2.

When the tip end of the original S enters into the nip of the second convey roller pair 2, the original S is shifted to the left as shown by the fat arrow in FIG. 23 while lowering the driven roller 2b in opposition to the biasing force of the pressurizing spring (not shown). In this case, a shift amount of the driven roller 2b corresponds to a thickness of the original S.

The movable element 33a follows the movement of the driven roller 2b in the engagement/disengagement direction (shown by the arrow a) to change its position. As a result, the potentiometer 33b outputs a voltage value corresponding to the movement of the movable element 33a (thickness of the original).

Data (or calculation equations) indicating the thickness of the original S and the voltage value outputted from the potentiometer are previously stored in the control device 70. In the control device 70, on the basis of the voltage value, the thickness of the original S is judged by referring to the data (or using the voltage value in the calculation equations). And, on the basis of the judged result, the shift amount of the second original convey roller pair 2 is determined.

[Eleventh Embodiment]

An eleventh embodiment of the present invention is characterized in that the second convey roller pair 2 is shifted in the thrust direction while ascertaining the position of the original by the lateral regist sensor 31.

Figure 24:
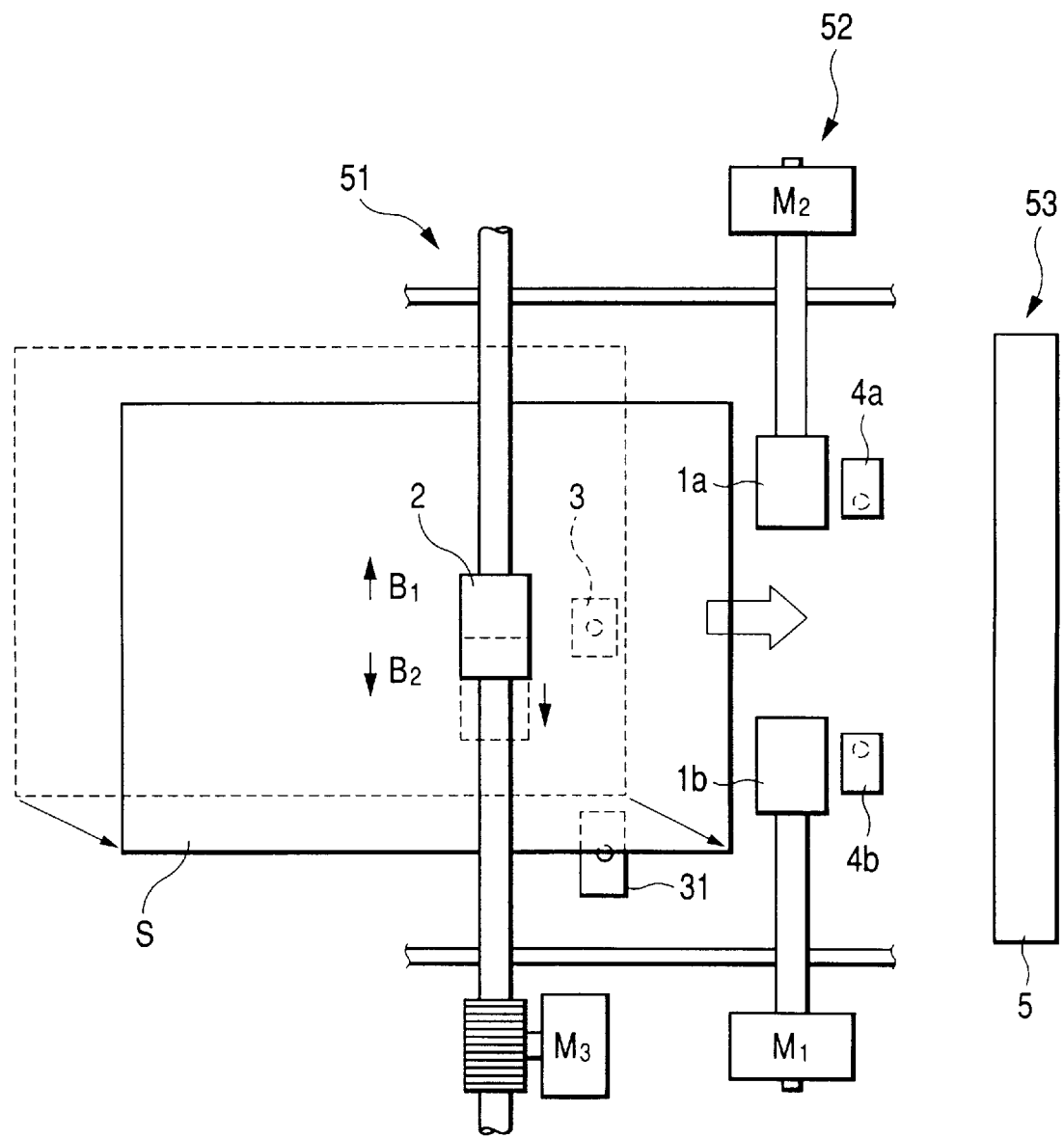
FIG. 24 is a plan view of a skew correction portion of an image reading apparatus according to an eleventh embodiment of the present invention.

FIG. 24 is a plan view a skew correction portion of a sheet conveying apparatus of an image reading apparatus according to the eleventh embodiment. In FIG. 24, the same elements as those in FIG. 17 are designated by the same reference numerals and explanation thereof will be omitted.

The lateral regist sensor 31 serves to detect the end of the original S after the tip end of the original S being conveyed reaches the original detect sensor 3. More specifically, the lateral regist sensor 31 according to the illustrated embodiment is constituted by an optical sensor of permeable type disposed at a predetermined position in the vicinity of and at a downstream side of the second convey roller pair 2 (i.e., disposed side by side with the original detect sensor 3 in the direction substantially perpendicular to the conveying direction and in the vicinity of the end of the original stack). The lateral regist sensor 31 outputs a detection signal to the control device 70 when the original S is positioned above (or below) the lateral regist sensor 31.

When the tip end of the original S being conveyed reaches the original detect sensor 3, if the presence of the original is detected by the lateral regist sensor 31, the third drive motor $M_3$ is rotated to shift the second convey roller pair 2 in the direction $B_1$. In this case, since the original S is pinched by the second convey roller pair 2, the original is shifted in the direction $B_1$ together with the second convey roller pair 2. When the detection result of the lateral regist sensor 31 is changed to a condition representing "absence" of the original, the control device 70 judges that the end of the original reaches the lateral regist sensor 31 and stops the driving of the third drive motor $M_3$.

To the contrary, when the tip end of the original S being conveyed reaches the original detect sensor 3, if the "absence" of the original is detected by the lateral regist sensor 31, the control device 70 rotates the third drive motor $M_3$ to shift the second convey roller pair 2 in the direction $B_2$. When the detection result of the lateral regist sensor 31 is changed to a condition representing "presence" of the original, the control device 70 judges that the end of the original reaches the lateral regist sensor 31 and stops the driving of the third drive motor $M_3$.

The positions of the sensors 3, 31 and the control number of revolutions of the third drive motor $M_3$ are selected so that such controls are finished before the tip end of the original S reaches the nip of the regist roller pair 1. With the above-mentioned arrangement and controls, while the original S is being pinched by the nip of the regist roller pair 1, the end of the original S is always positioned in the lateral regist sensor portion 31, to thereby permit the lateral registration.

In the illustrated embodiment, while an example that the single lateral regist sensor 31 is used was explained, a plurality of lateral regist sensors may be provided in accordance with the original size (length in the lateral direction) or the lateral regist sensor may be shifted in accordance with the original size or the lateral regist sensor may be set at any position by the operator.

[Twelfth Embodiment]

Next, an image reading apparatus having a sheet conveying apparatus according to a twelfth embodiment of the present invention will be explained with reference to FIGS. 25, 26 and 27.

Figure 25:
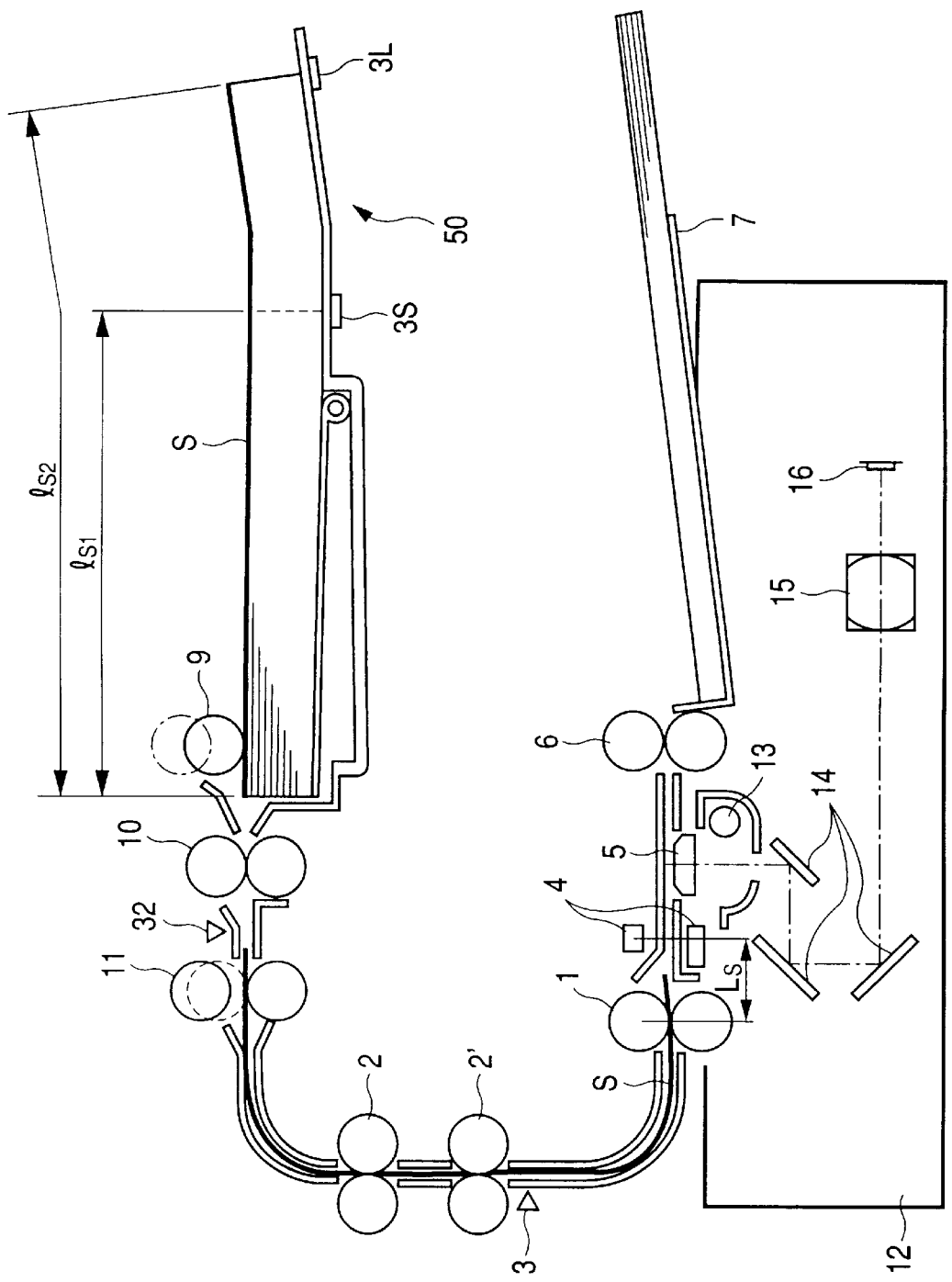
FIG. 25 is a schematic view briefly showing an image reading apparatus according to a twelfth embodiment of the present invention.
Figure 26:
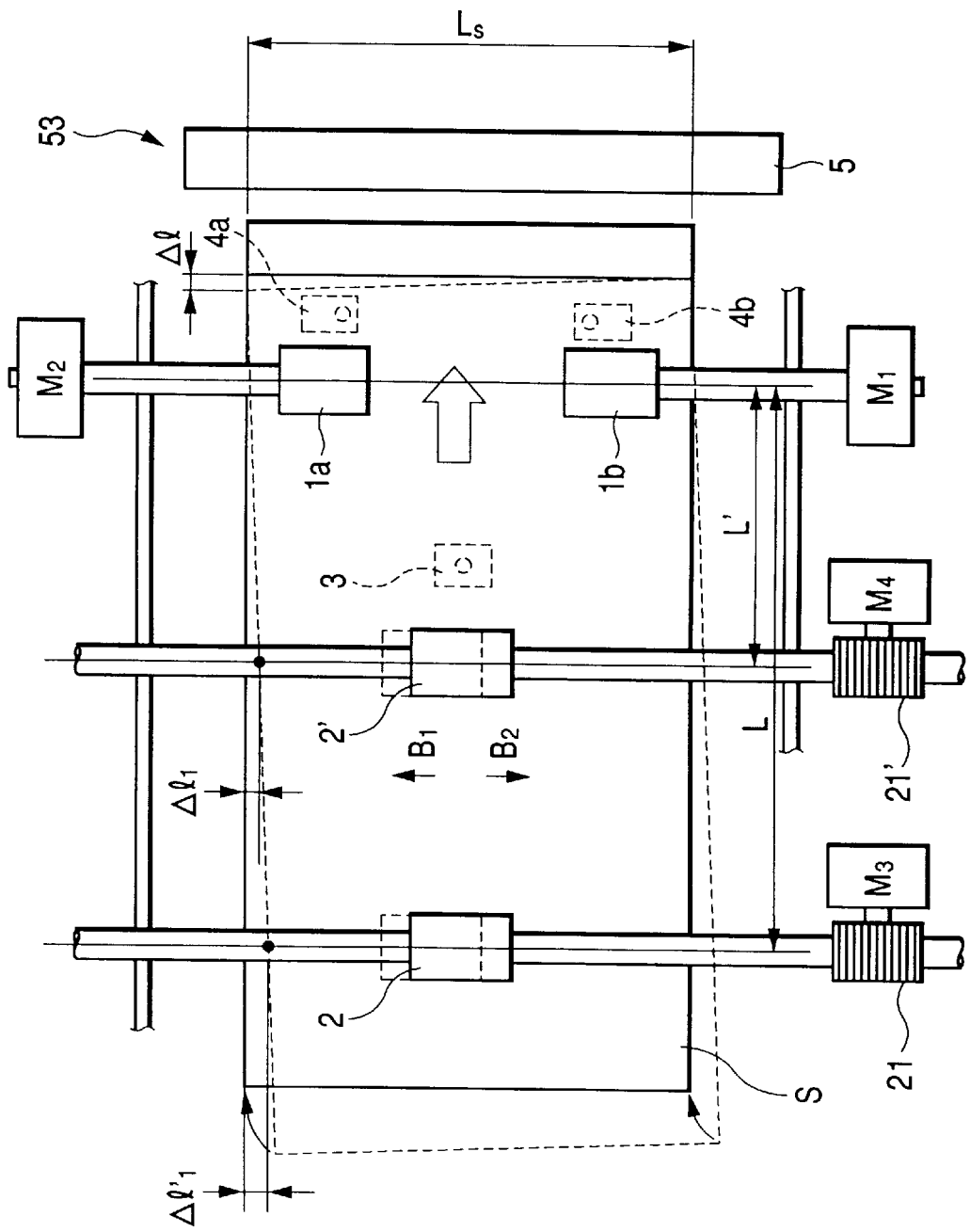
FIG. 26 is a plan view of a skew correction portion.

As shown in FIGS. 25 and 26, an image reading apparatus according to the twelfth embodiment includes a third pair of convey rollers 2' disposed at a downstream side of the second convey roller pair 2, and a thrust position of the third convey roller pair 2' can be controlled by a fourth drive motor $M_4$. Incidentally, since the construction and operation (including detection of home position by using the microswitch 27a) of the third convey roller pair 2' are the same as those of the second convey roller pair 2, explanation thereof will be omitted.

Figure 27:
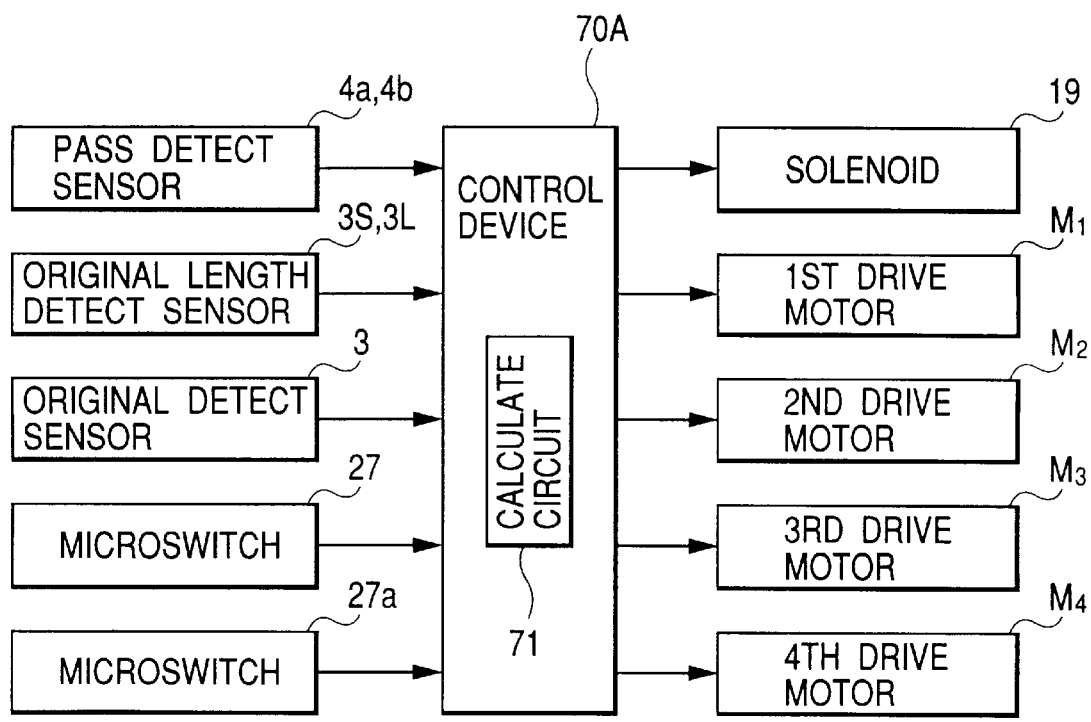
FIG. 27 is a block diagram showing a control portion.

Now, an operation will be described (FIG. 27 shows a control arrangement).

The original S entered into and pinched by the nip of the regist roller pair 1 is conveyed to the image reading portion 53 as it is; meanwhile, the original passes through the pass detect sensors 4a, 4b. A control device 70A shown in FIG. 27 calculates the inclination of the original S on the basis of the detection signals from the pass detect sensors 4a, 4b and controls the rotational speeds of the first and second drive motors $M_1$, $M_2$ on the basis of the calculated result. At the same time, the thrust positions of the second and third convey roller pairs 2, 2' are shifted. Now, the control of the thrust positions will be fully described.

The calculate circuit 71 of the control device 70A calculates the shift control amounts of the second and third convey roller pairs 2, 2' on the basis of the inclination of the tip end of the original S. By rotating the third and fourth drive motors $M_3$, $M_4$ by required amounts on the basis of the calculated result, the thrust positions of the second and third convey roller pairs 2, 2' are shifted. The second convey roller pair 2 is shifted in the direction $B_1$ by an amount of $\Delta l_1'$ and the third convey roller pair 2' is shifted in the direction Bi by an amount of $\Delta l_1$ (refer to FIG. 26). In this case, the shift amount $\Delta l_1'$ of the second convey roller pair 2 and the shift amount $\Delta l_1$ of the third convey roller pair 2' are represented by the following equations:

$$\Delta l_1 = L'/L_S \times \Delta l, \text{ and}$$

$$\Delta l_1' = L/L_S \times \Delta l$$

where, $\Delta l_1$ is the shift amount of the third convey roller pair 2', $\Delta l_1'$ is the shift amount of the second convey roller pair 2, $\Delta l$ is the inclination of the tip end of the original S, L is a distance from the regist roller pair 1 to the second convey roller pair 2, L' is a distance from the regist roller pair 1 to the third convey roller pair 2' and $L_S$ is a width of the original S.

Thereafter, when the trail end of the original S is detected by the original detect sensor 3, the control device 70A judges that the trail end of the original S has passed through the second convey roller pair 2 on the basis of the detection signal from the original detect sensor 3. As a result, the third and fourth drive motors $M_3$, $M_4$ are rotated reversely by the control device 70.

By the reverse rotations of the third and fourth drive motors $M_3$, $M_4$, the second and third convey roller pairs 2, 2' are sifted in the direction $B_2$ in FIG. 26. When the second and third convey roller pairs 2, 2' are returned to their home positions, the control device 70A stops the third and fourth drive motors $M_3$, $M_4$, to thereby prepare for the next original skew correction. Since the further operations are the same as those of the eighth embodiment, explanation thereof will be omitted.

[Thirteenth Embodiment]

Next, an image reading apparatus having a sheet conveying apparatus according to a thirteenth embodiment of the present invention will be explained with reference to FIGS. 28 and 29.

In the thirteenth embodiment, in place of the pass detect sensors 4a, 4b in the twelfth embodiment, inclination detect sensors 32a, 32b are disposed at an upstream side. Since the other arrangements are the same as those in the twelfth embodiment, the difference from the twelfth embodiment will be described mainly hereinbelow.

The inclination detect sensors, 32a, 32b serve to detect the inclination of the tip end of the original after the sheet supply and are spaced apart from each other with a predetermined distance therebetween along the direction substantially perpendicular to the conveying direction and are disposed in the vicinity of and at a downstream side of the separation/supply roller pair 10. A control arrangement of the thirteenth embodiment is shown in FIG. 29.

Now, an operation will be explained. When the original S conveyed by the separation/supply roller pair 10 is detected by the inclination detect sensors 32a, 32b, detection signals from the sensors are sent to a control device 70B, and inclination of the original S is calculated by a calculate circuit 71 of the control device 70B on the basis of the detection signals.

Thereafter, when the original S is further conveyed and the tip end of the original S reaches the original detect sensor 3 (i.e., when the original is pinched by both second convey roller pair 2 and third convey roller pair 2'), the skew-feed of the original is corrected by controlling the third and fourth drive motors $M_3$, $M_4$ by means of the control device 70B on the basis of the calculated result.

Figure 28:
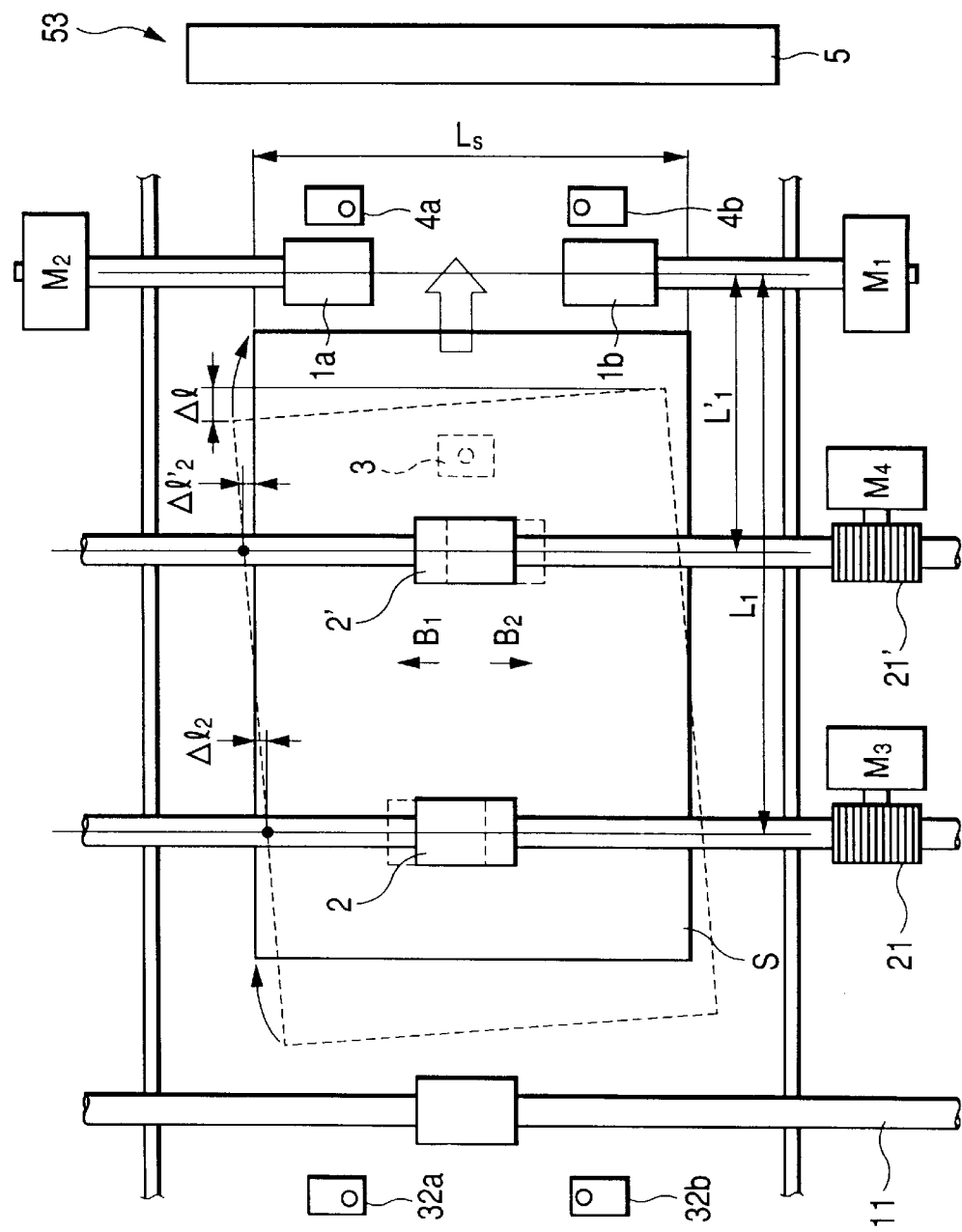
FIG. 28 is a schematic view briefly showing an image reading apparatus according to a thirteenth embodiment of the present invention.
Figure 29:
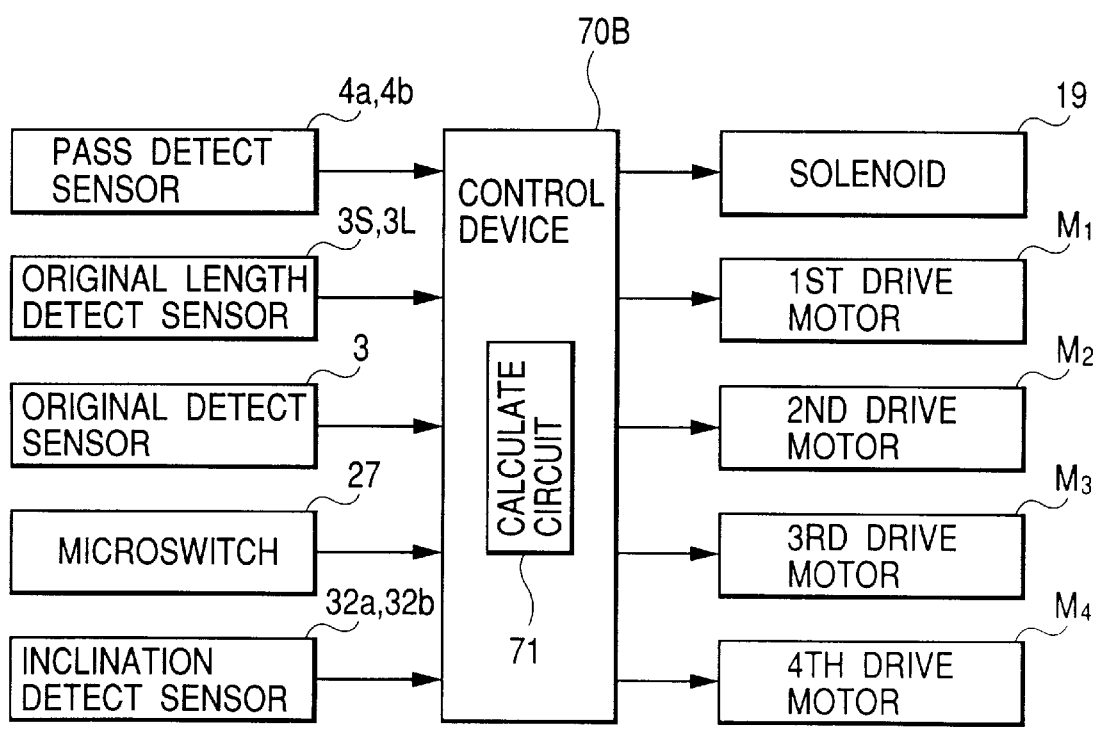
FIG. 29 is a block diagram showing a control portion.

In case of FIG. 28, the second convey roller pair 2 may be shifted in the direction $B_1$ by an amount of $\Delta l_2$ and the third convey roller pair 2' may be shifted in the direction $B_2$ by an amount of $\Delta l_2'$. Incidentally, the rotational speeds of the motors $M_3$, $M_4$ are selected so that the control is finished before the trail end of the original leaves the third convey roller pair 2'.

The shift control amounts $\Delta l_2$, $\Delta l_2'$ of the roller pairs 2, 2' are represented by the following equation:

$$\Delta l_2 = \Delta l_2' = \frac{1}{2} \times (L_1' - L_1)/L_S \times \Delta l$$

where, $\Delta l_2$ is the shift control amount of the second convey roller pair 2, $\Delta l_2'$ is the shift control amount of the third convey roller pair 2', $(L_1' - L_1)$ is a distance between the second convey roller pair 2 and the third convey roller pair 2', $\Delta l$ is the skew amount of the original and $L_S$ is a width of the original.

The original S skew-corrected in this way reaches the regist roller pair 1. Since a further operations are the same as those of the twelfth embodiment, explanation thereof will be omitted.

In this embodiment, while an example that two pairs of shiftable convey rollers are provided was explained, the present invention is not limited to such an example. Further, a plurality of engageable/disengageable convey rollers may be used.

Of course, the lateral regist correction function as described in connection with the eleventh embodiment may be incorporated into the thirteenth embodiment. In addition, as described in connection with the eighth embodiment, the shift amounts of the second and third convey roller paris 2, 2' may be changed in accordance with the sheet thickness information (representing the original thickness) and/or sheet length information (representing the original length).

In the above explanations, while the present invention was applied to the original image reading apparatus, the present invention may be applied to an image forming apparatus such as a copying machine and a printer, as well.

As mentioned above, according to the present invention, by controlling the thrust positions of the convey roller pairs during the skew correction, the rotational direction movement of the original during the skew correction can be promoted, to thereby improve the accuracy of the skew correction.

By changing the thrust positions of the convey roller pairs in accordance with the thickness and/or size of the original, the accuracy of the skew correction can be maintained regarding various originals having various thicknesses and sizes and the originals can be conveyed with minimum sheet interval.

Further, by applying the sheet conveying apparatus to the image reading apparatus or the image forming apparatus, in apparatus having the same conveying speed, the number of sheet to be treated per unit time can be increased and productivity can be improved.

Incidentally, in the above-mentioned embodiments, while an example that the conveying speed of the convey roller pair regarding the advanced side (front corner) of the original is delayed with respect to the other convey roller pair to correct the skew-feed was explained, the present invention is not limited to such an example, but, the skew-feed may be corrected by increasing the conveying speed of the convey roller pair regarding the delayed side of the original with respect to the other convey roller pair. Further, the skew-feed may be corrected by decreasing the conveying speed of the convey roller pair regarding the advanced side of the original and by increasing the conveying speed of the convey roller pair regarding the delayed side of the original.

What is claimed is:

1. A sheet conveying apparatus which includes a skew correction means for correcting skew-feed of a sheet and in which the sheet is conveyed while correcting the skew-feed of the sheet by said skew correction means, comprising:

at least one sheet convey means disposed upstream of said skew correction means in a sheet conveying direction for conveying the sheet to said skew correction means and being shiftable in a direction substantially perpendicular to the sheet conveying direction;

a shift means for shifting said sheet convey means pinching the sheet in the direction substantially perpendicular to the sheet conveying direction to thereby shift the sheet to be skew-corrected by said skew correction means in a skew correction direction;

a sheet skew amount detection means for detecting a skew amount of the sheet; and a control means for controlling driving of said shift means to shift said sheet convey means by an amount corresponding to the skew amount on the basis of sheet skew amount information from said sheet skew amount detection means.

2. A sheet conveying apparatus which includes a skew correction mean for correcting skew-feed of a sheet and in which the sheet is conveyed while correcting the skew-feed of the sheet by said skew correction means, comprising:

a plurality of sheet convey means disposed upstream of said skew correction means in a sheet conveying direction to convey the sheet to said skew correction means and being shiftable in a direction substantially perpendicular to the sheet conveying direction;

a plurality of shift means for shifting said sheet convey means pinching the sheet, respectively, in the direction substantially perpendicular to the sheet conveying direction to thereby shift the sheet before skew-corrected by said skew correction means in a skew correction direction;

a sheet skew amount detection means disposed at said sheet convey means in the sheet conveying direction for detecting a skew amount of the sheet; and a control means for controlling driving of said plurality of shift means to shift said plurality of sheet convey means by amounts corresponding to the skew amount on the basis of sheet skew amount information detected by said sheet skew amount detection means.

3. A sheet conveying apparatus according to claim 1 or 2, further comprising:

at least one engageable/disengageable upstream sheet convey means disposed upstream of said sheet convey means in the sheet conveying direction;

a sheet size detection means disposed upstream of said upstream side sheet convey means in the sheet conveying direction for detecting a length of the sheet in the sheet conveying direction; and an engagement/disengagement control means for selectively effecting engagement or disengagement of said upstream sheet convey means on the basis of sheet length information detected by said sheet size detection means.

4. A sheet conveying apparatus according to one of claims 1 to 2, wherein said skew correction means has two sets of roller pairs arranged side by side along a direction transverse to the sheet conveying direction for pinching and conveying the sheet, and said control means controls the skew-feed of the sheets.

5. A sheet conveying apparatus according to claim 1 or 2, wherein the position control of said sheet convey means is effected to coincide with movement of the sheet in the sheet skew correction direction during the skew correction.

6. A sheet conveying apparatus according to claim 1 or 2, wherein the position control of said sheet convey means is effected during the skew correction performed by said skew correction means.

7. A sheet conveying apparatus according to one of claim 1 or 2, wherein an enlarged portion is formed in a part of a sheet convey path for conveying the sheet from said sheet convey means to said skew correction means.

8. A sheet conveying apparatus according to one of claim 1 or 2, wherein a part of walls defining a sheet convey path for conveying the sheet from said sheet convey means to said skew correction means is constituted by a rockable member.

9. A sheet conveying apparatus according to claim 1 or 2, further comprising a sheet end detection means disposed in the vicinity of said sheet convey means for detecting an end of the sheet, and wherein said control means controls the shifting movement of said sheet convey means until the end of the sheet is detected by said sheet end detection means.

10. A sheet conveying apparatus according to claim 9, wherein said control means controls the shifting movement of said sheet convey means from when the sheet is pinched by said sheet convey means till when the tip end of the sheet reaches said skew correction means.

11. A sheet conveying apparatus according to claim 1 or 2, further comprising a sheet thickness detection means disposed upstream of said sheet convey means in the sheet conveying direction for detecting a thickness of the sheet, and wherein said control means controls the shifting movement of said sheet convey means on the basis of sheet thickness information detected by said sheet thickness detection means and the sheet skew amount information.

12. A sheet conveying apparatus according to claim 1 or 2, further comprising a sheet size detection means disposed upstream of said sheet convey means in the sheet conveying direction for detecting a size of the sheet, and wherein said control means controls the shifting movement of said sheet convey means on the basis of sheet size information detected by said sheet size detection means and the sheet skew amount information.

13. An image reading apparatus comprising a sheet conveying apparatus of claim 1 or 2, wherein said sheet conveying apparatus is disposed upstream of an image reading portion in the sheet conveying direction.

14. An image forming apparatus comprising a sheet conveying apparatus of claim 1 or 2, wherein said sheet conveying apparatus is disposed upstream of an image forming portion in the sheet conveying direction.

15. A sheet conveying apparatus comprising:
   a sheet convey means shiftable in a direction substantially perpendicular to a sheet conveying direction for pinching and conveying a sheet member;
   a skew amount detection means for detecting skew-feed of the sheet member being conveyed;
   two sets of roller pairs independently disposed on a line perpendicular to the sheet conveying direction;
   two drive sources for driving said roller pairs independently;
   a control means for controlling driving speeds of said drive sources in accordance with a detection result from said skew amount detection means to thereby correct skew-feed of the sheet member conveyed by said sheet convey means; and
   a shift means for shifting said sheet convey means in the direction substantially perpendicular to the sheet conveying direction; and
   wherein said control means controls a shift amount of said sheet convey means shifted by said shift means, on the basis of the control of the driving speeds of said drive sources.

16. A sheet conveying apparatus comprising:
   a plurality of sheet convey means shiftable in a direction substantially perpendicular to a sheet conveying direction for pinching and conveying a sheet member;
   a skew amount detection means for detecting skew-feed of the sheet member being conveyed;
   two sets of roller pairs independently disposed on a line perpendicular to the sheet conveying direction;
   two drive sources for driving said rollers pairs independently;
   a control means for controlling driving speeds of said drive sources in accordance with a detection result from said skew amount detection means to thereby correct skew-feed of the sheet member conveyed by said sheet convey means;
   a plurality of shift means for shifting the respective sheet convey means in the direction substantially perpendicular to the sheet conveying direction; and
   a control means for controlling shift amounts of said sheet convey means shifted by said shift means, on the basis of control amount of the driving speeds of said drive sources.

17. A sheet conveying apparatus according to claim 15 or 16, further comprising:
   at least one engageable/disengageable upstream sheet convey means disposed upstream of said sheet convey means in the sheet conveying direction;
   a sheet size detection means disposed upstream of said upstream side sheet convey means in the sheet conveying direction for detecting a length of the sheet in the sheet conveying direction; and
   an engagement/disengagement control means for effecting engagement or disengagement of said upstream sheet convey means on the basis of a detection result of said sheet size detection means.

18. A sheet conveying apparatus according to one of claims 15 to 16, wherein said control means controls the shifting movement of said sheet convey means during the skew correction effected by said control means.

19. A sheet conveying apparatus according to claim 15 or 16, wherein said control means effects the control so that driving speeds or rotational angular speeds of said drive sources differ from each other.

20. A sheet conveying apparatus according to one of claims 15 to 16, wherein a control amount is imaginary shift amount or imaginary position information of the sheet member when the sheet member is conveyed by said drive sources.

21. A sheet conveying apparatus according to claim 15 or 16, further comprising a sheet end detection means disposed in the vicinity of said sheet convey means for detecting an end of the sheet member, and wherein said control means controls the shifting movements of said sheet convey means until the end of the sheet member is detected by said sheet and detection means.

22. A sheet conveying apparatus according to claim 21, wherein said control means controls the shifting movements of said sheet convey means from when the sheet member is pinched by said sheet convey means till when the tip end of the sheet member reaches said roller pairs.

23. A sheet conveying apparatus according to claim 15 or 16, further comprising a sheet thickness detection means disposed upstream of said sheet convey means in the sheet conveying direction for detecting a thickness of the sheet member, and wherein said control means controls the shifting movements of said sheet convey means on the basis of a detection result of said sheet thickness detection means and a control amount.

24. A sheet conveying apparatus according to claim 15 or 16, further comprising a sheet size detection means disposed upstream of said sheet convey means in the sheet conveying direction for detecting a size of the sheet, and wherein said control means controls the shifting movements of said sheet convey means on the basis of a detection result of said sheet size detection means and a control amount.

25. An image reading apparatus comprising:
   an image reading portion for reading an image on a sheet member; and
   sheet conveying apparatus according to one of claim 15 or 16 disposed upstream of said image reading portion.

26. An image forming apparatus comprising:
   an image portion for reading an image on a sheet member; and
   said sheet conveying apparatus according to one of claim 15 or 16 disposed upstream of said image forming portion.

27. A sheet conveying apparatus including a skew correction means for correcting skew-feed of a sheet being conveyed, and a convey means for conveying the sheet to said skew correction means while pinching the sheet,
   wherein said convey means is shiftable in a direction transverse to a sheet conveying direction; and
   further comprising a shift means for shifting said convey means in the direction transverse to the sheet conveying direction; and
   a control means for controlling said shift means to shift said convey means pinching the sheet in a skew correction direction in synchronous with the sheet shifted in the skew correction direction by said skew correction means.

28. A sheet conveying apparatus according to claim 27, wherein said skew correction means has two sets of roller pairs arranged side by side along the direction transverse to the sheet conveying direction for pinching and conveying the sheet, and said control means corrects the skew-feed of the sheet by differentiating conveying speeds of said roller pairs.

29. A sheet conveying apparatus according to claim 28, wherein said control means controls so that difference in speed between said roller pairs is gradually increased and then is returned to an initial difference so that the skew-feed is corrected until the difference is returned to the initial difference.

30. A sheet conveying apparatus according to claim 28, wherein said control means corrects the skew-feed of the sheet by delaying the conveying speed of the roller pair associated with an advanced side of the front corner of the sheet with respect to the other roller pair.

31. A sheet conveying apparatus according to claim 30, wherein said control means gradually reduces the conveying speed of the roller pair associated with an advanced side of the front corner of the sheet and then increase said conveying speed to an initial value so that the skew correction is effected until said conveying speed is returned to the initial value.

32. A sheet conveying apparatus according to claim 29 or 31, wherein said control means controls said shift means so that said convey means is shifted faster as the difference in speed between said two sets of roller pairs is increased.

33. A sheet conveying apparatus according to claim 27, further comprising an image forming means for forming an image on the sheet conveyed by said skew correction means.

34. A sheet conveying apparatus according to claim 27, further comprising an image reading means for reading an image on the sheet conveyed by said skew correction means.

* * * * *

UNITED STATES PATENT AND TRADEMARK OFFICE
CERTIFICATE OF CORRECTION

PATENT NO.     : 6,059,285
DATED          : May 9, 2000
INVENTOR(S)    : Takeshi Suga, et al.

It is certified that error appears in the above-identified patent and that said Letters Patent is hereby corrected as shown below:

<u>Item [56], References Cited,</u>
FOREIGN PATENT DOCUMENTS, "0 536 885  4/1993 Japan" should read --
0 536 885 4/1993  European Pat. Off. --.

<u>Sheet 22,</u>
FIG. 22, "DIFFERENCIATE" should read -- DIFFERENTIATE --.

<u>Column 1,</u>
Line 15, "a" should be deleted.
Line 31, "as" should be deleted.
Line 46, " is electrically can be" should read -- can be electrically --.

<u>Column 4,</u>
Line 32, "view" should read -- view of --.

<u>Column 8,</u>
Line 1, "fed" should read -- feed --.
Line 15, "$1_{s2}$) ." should read -- $1S_2$) . --.

<u>Column 9,</u>
Line 65, "coincidence" should read -- coincident --.

<u>Column 15,</u>
Line 25, "Wide" should read -- side --.
Line 26, "deduced" should read -- reduced --.

<u>Column 17,</u>
Line 4, "depended" should read -- dependent --.

<u>Column 18,</u>
Line 33, "are" should read -- do --.

<u>Column 19,</u>
Line 1, "grater" should read -- greater --.
Line 14, "coincidence" should read -- coincident --.

UNITED STATES PATENT AND TRADEMARK OFFICE
CERTIFICATE OF CORRECTION

PATENT NO. : 6,059,285
DATED : May 9, 2000
INVENTOR(S) : Takeshi Suga, et al.

It is certified that error appears in the above-identified patent and that said Letters Patent is hereby corrected as shown below:

Column 20,
Line 6, "view" should read -- view of --.

Column 22,
Line 57, "paris" should read -- pairs --.

Column 23,
Line 62, "before" should read -- before being --.

Column 24,
Line 34, "claim" should read -- claims --.
Line 38, "claim" should read -- claims --.

Column 25,
Line 4, "claim" should read -- claims --.
Line 8, "claim" should read -- claims --.
Line 42, "rollers" should read -- roller --.

Column 26,
Line 65, "synchronous" should read -- synchronism --.

Column 28,
Line 4, "increase" should read -- increases --.

Signed and Sealed this

Fourth Day of September, 2001

*Attest:*

*Attesting Officer*

NICHOLAS P. GODICI
*Acting Director of the United States Patent and Trademark Office*